Nov. 9, 1937.                L. M. KEEFE                2,098,248
                          MASTER CONTROL UNIT
                       Filed July 31, 1931        7 Sheets-Sheet 1

INVENTOR
LINCOLN M. KEEFE.
BY
ATTORNEY

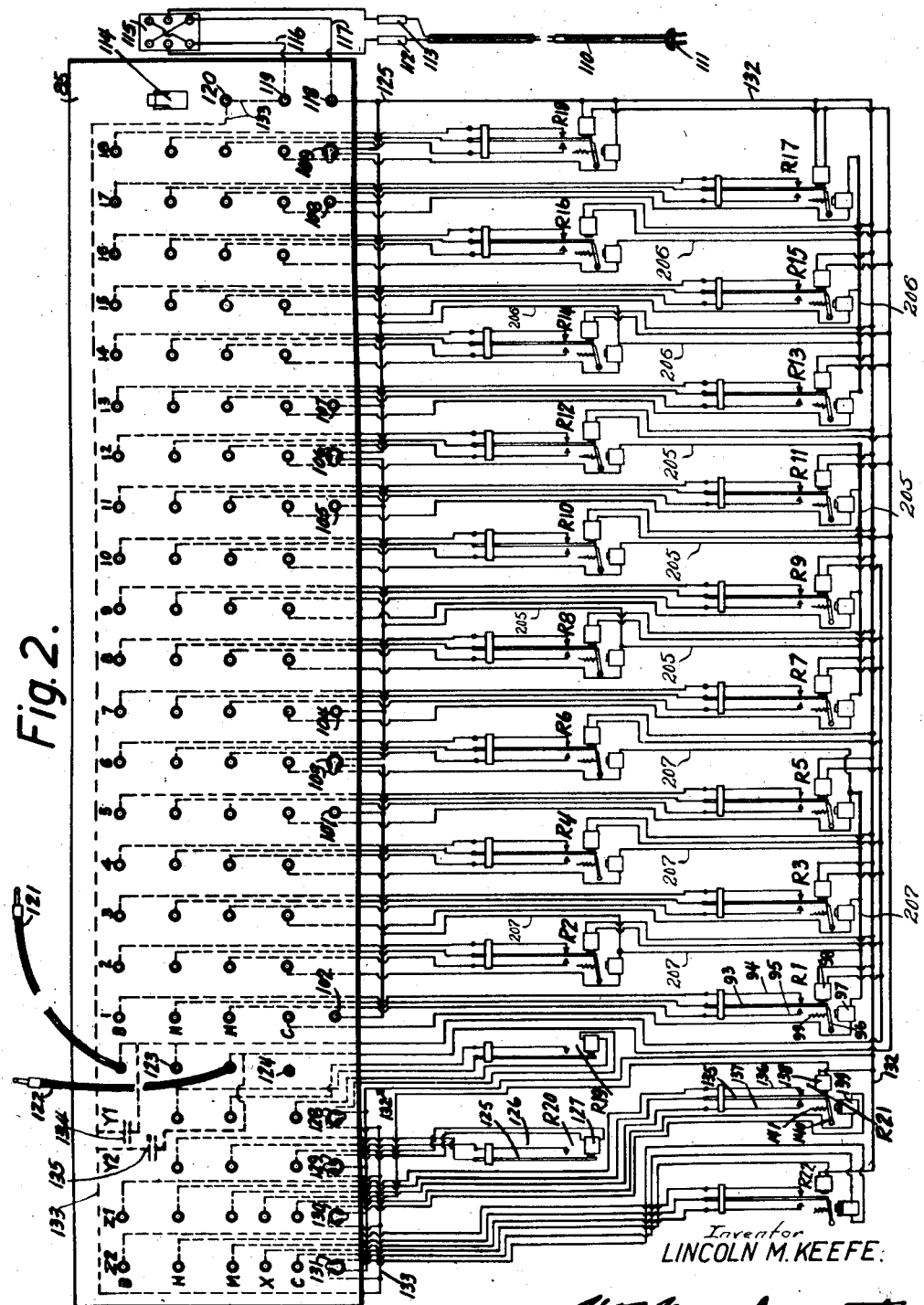

Nov. 9, 1937.  L. M. KEEFE  2,098,248
MASTER CONTROL UNIT
Filed July 31, 1931  7 Sheets-Sheet 3
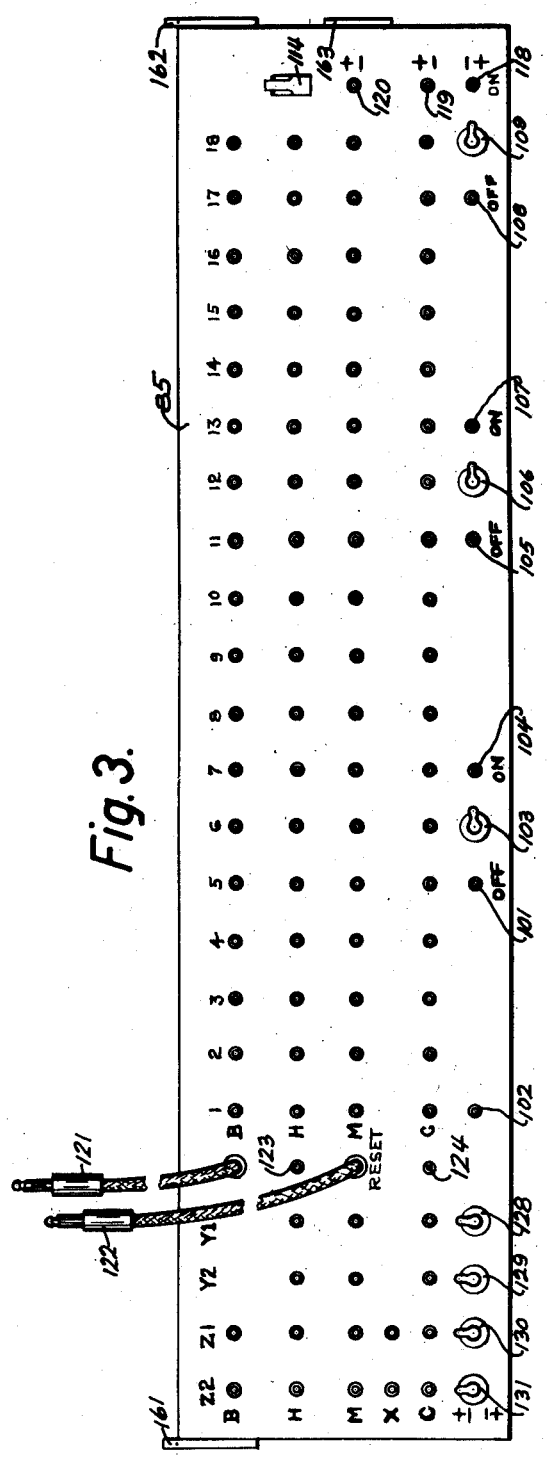
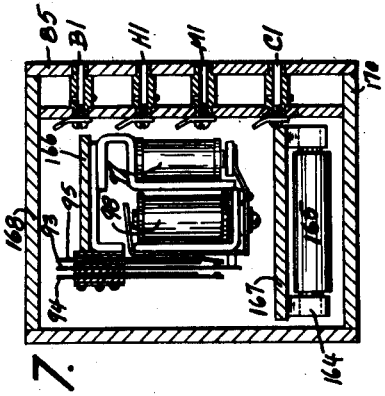
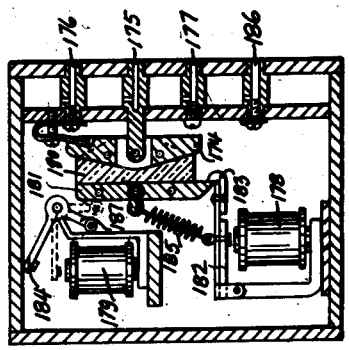
INVENTOR
LINCOLN M. KEEFE.
ATTORNEY Nov. 9, 1937.   L. M. KEEFE   2,098,248
MASTER CONTROL UNIT
Filed July 31, 1931   7 Sheets-Sheet 4
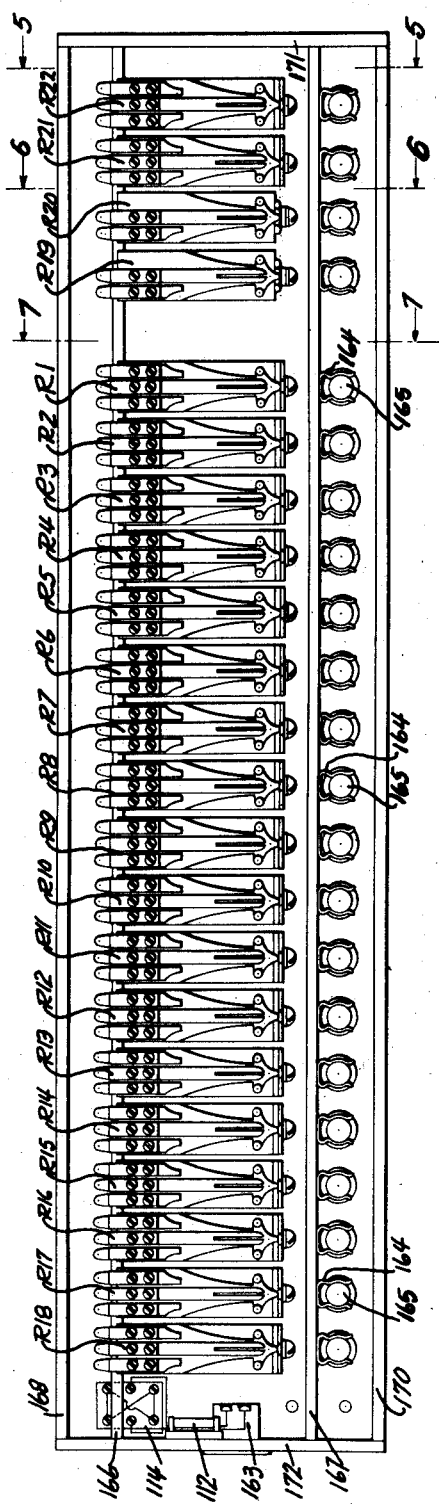
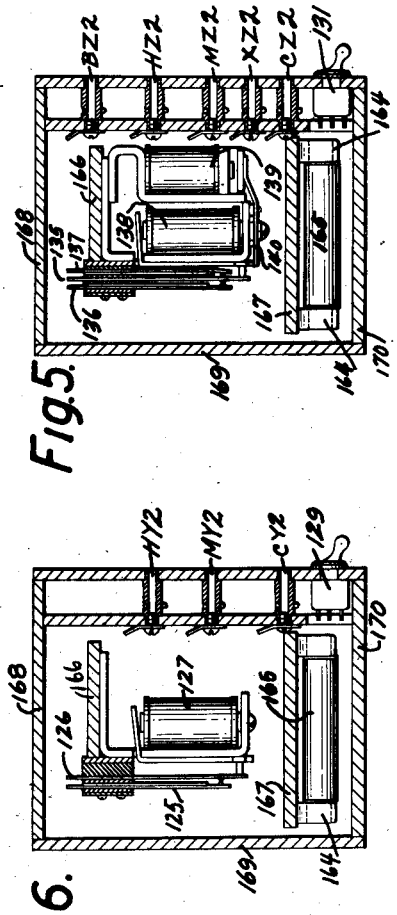
INVENTOR
LINCOLN M. KEEFE.
BY
ATTORNEY

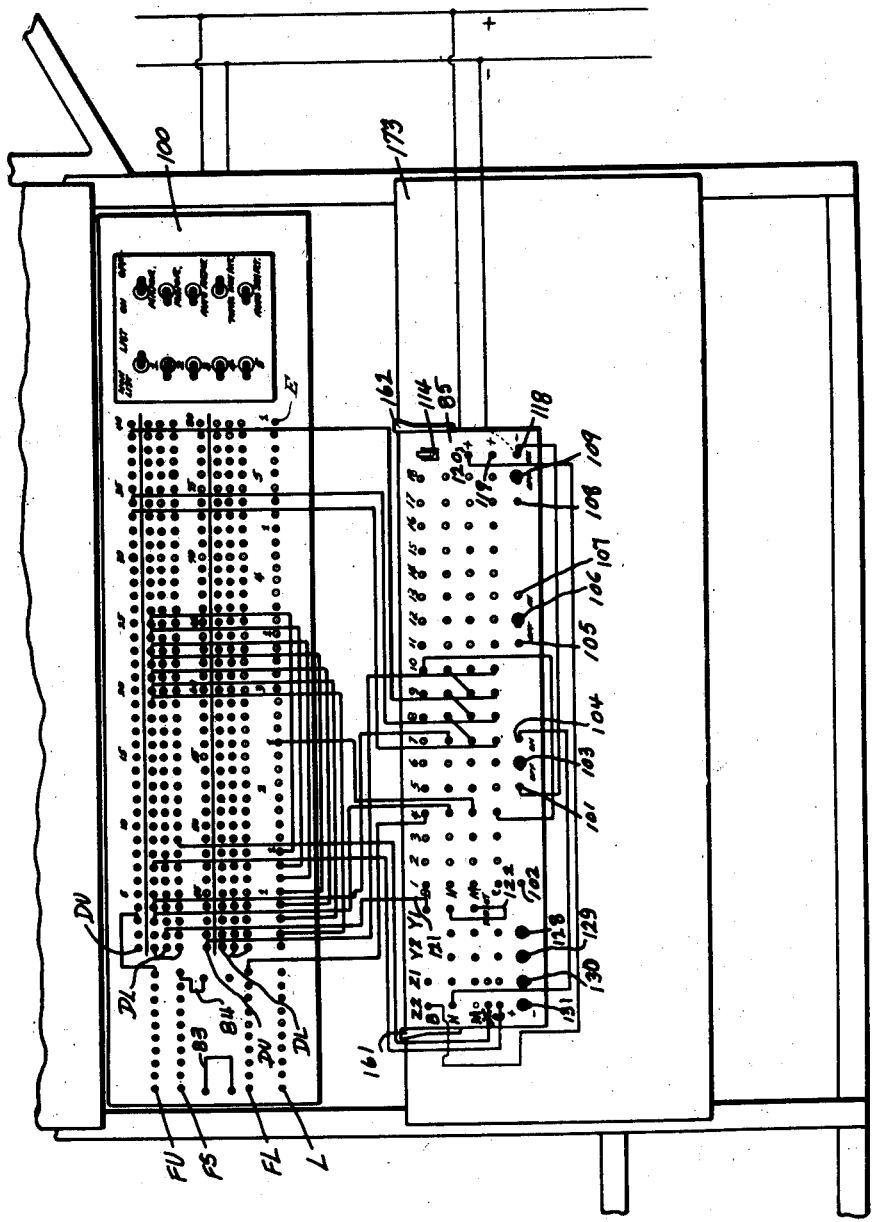

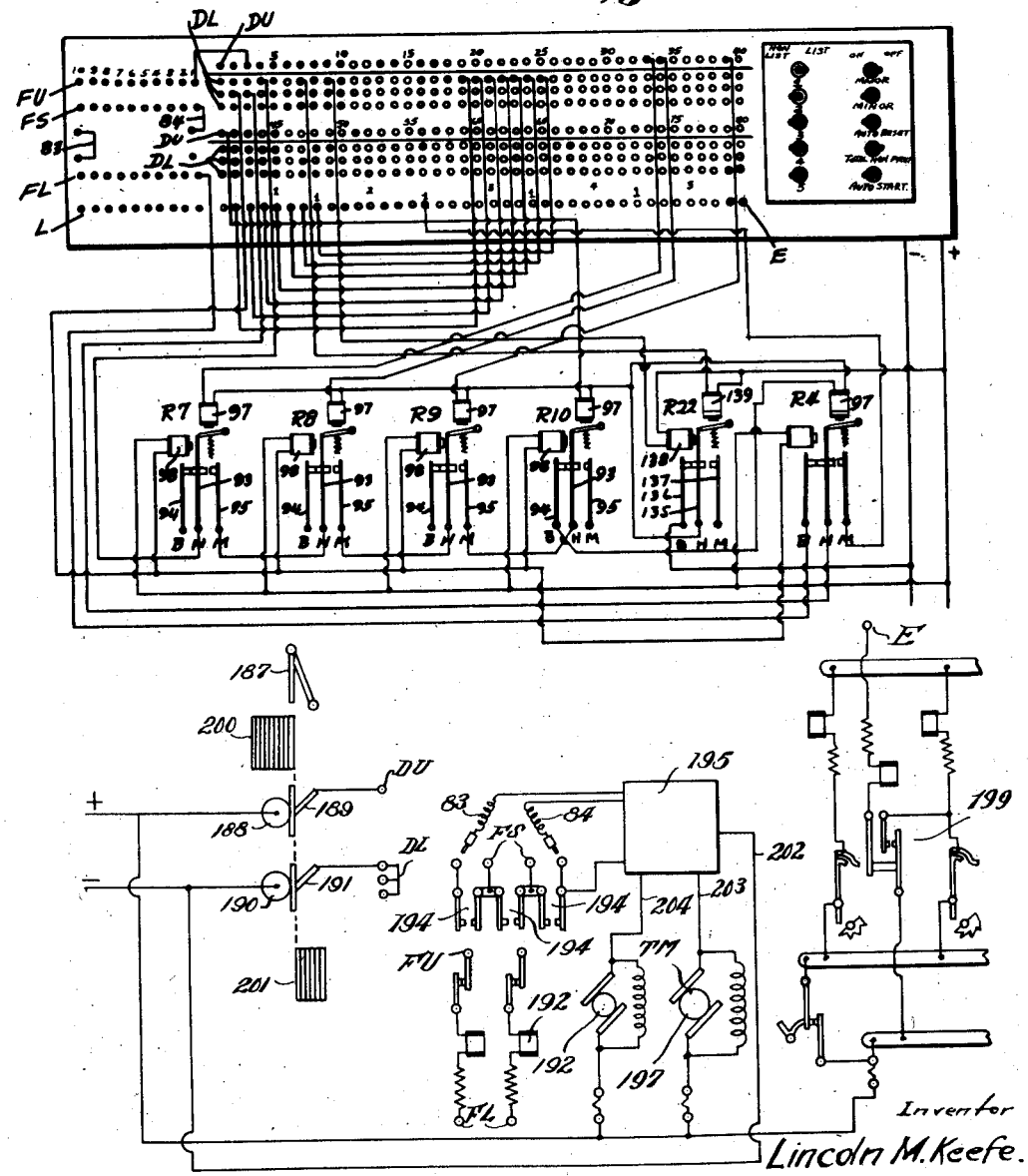

Patented Nov. 9, 1937

2,098,248

UNITED STATES PATENT OFFICE 2,098,248

MASTER CONTROL UNIT

Lincoln M. Keefe, Springfield, Mass.

Application July 31, 1931, Serial No. 554,191

51 Claims. (Cl. 235—61.7)

This invention relates to a control device for record controlled apparatus, and more particularly to a device forming a master control unit adapted to be attached to existing record controlled devices to automatically and selectively control the apparatus and/or one or more functions thereof. The functioning of this "master control unit" as distinguished from existing controls is hereinafter more fully defined.

An object of the invention is to provide a master control unit that may be readily attached to existing record controlled apparatus, such for instance, as a tabulating machine, to increase the uses or range of work to which the machine may be applied.

Before stating other objects of the invention, it is desirable to briefly refer to the present state of the art, particularly in respect to tabulating machines which, by way of illustration will be used in connection with the following description of the master control unit.

The present application describes and claims a device particularly suited to carry out the method of controlling record controlled devices as described in the pending application for patent, Serial No. 549,449, filed July 8, 1931.

The invention may be used with record controlled devices.

The "record" may comprise any suitable means for causing electrical or mechanical action to take place and may consist of a card, stencil, paper tape or the like, having holes or perforations therein or tabs projecting therefrom. Or the record may be impregnated at desired points with a liquid which will make the record an electrical conductor at said points, or the record may have metal inserts therein, or may be of metal with non-conducting inserts therein; or may be of any material having colors, marks or symbols thereon adapted through the medium of light sensitive means, to cause a change in state in an electrical circuit for the purpose of operating electrical or mechanical devices under the control thereof.

There are many machines controlled or adapted to be controlled by records to which this master control unit is applicable. Some of such machines are punching, sorting, tabulating, interpreting, addressing, folding and inserting machines; those for collating records and the like; machines for packing, and machines adapted to be controlled by cards and the like for weaving, knitting, printing, embossing, engraving and moulding. The invention is also applicable to machines for die sinking and metal cutting adapted to be controlled by a pattern or record, including the operation of screw machines and the like where a relatively inexpensive record can be made to replace the cams heretofore used.

The master control device may be applied to the foregoing and many other machines by the use of suitable electrical or mechanical instrumentalities, the latter including pneumatic and hydraulic means, such as a series of control valves or the like. The exact means necessary to carry out the invention is immaterial and is dependent upon the type of apparatus or equipment it is desired to control, and the controls already in such apparatus, equipment or device.

In order to describe the use of the master control unit as applied to a mechanical device in common use, it will be described as employed in connection with a well known electrical tabulating machine as described in the patent to Lake et al., No. 1,775,132, dated September 9, 1930, and in order to point out the advantages obtained by the use of this device an example or problem showing its use in connection with the operation of the said tabulating machine will be given.

Tabulating machines are used where it is desired to accumulate, print or list quantities represented by perforations in record cards such as those hereinafter described. In many cases it is desired to print only from cards having a particular hole or combination of holes therein and from no others, although the cards from which it is desired to print may be and often are indiscriminately scattered through a large number of cards. The procedure heretofore has been to sort out the wanted cards from the other cards by putting all of the cards through a sorting machine which, by suitable mechanism under the control of the holes in the cards, sorts out the wanted cards and segregates them from the others.

As such sorting machines are well known, it is not necessary to here describe them in detail.

Assuming that the "wanted" cards have been sorted out by the sorting machine, they are passed through the tabulating machine and after the desired data is obtained therefrom the cards are usually reaggregated with the cards from which they were selected and the entire group of cards reassembled in their original order or sequence.

The printing-tabulating machine is herein described only in sufficient detail to enable the functioning of the present invention therewith to be understood. A typical machine such as that described in the aforesaid patent consists of:

*Element Group (1)*.—A card feeding device by means of which the record cards are passed through upper and lower sets of brushes, there being an upper and a lower brush for each vertical column on the record card, these brushes being adapted to establish an electrical contact through perforations in the record cards. (In other devices this sensing means could be operated by any other suitable indicia on the card or record.) For the purposes of this specification, this feeding and contact mechanism may be termed the feed end of the machine or "sensing means".

*Element Group (2).*—A plurality of accumulators (which may or may not have printing devices associated therewith) and this portion of the mechanism may, for the purposes of this specification, be termed "an accumulator means" or "differentially-positioned means". This "means" has its own controls, operated by some of the impulses from the sensing means.

*Element Group (3).*—A plurality of machine control devices comprised of a group control mechanism, relays and cam actuated contacts and circuits controlled thereby for controlling the operation of both the tabulating motor and the reset motor, which may be placed under the control of the sensing means and, in accordance with perforations therein, control the operation of the machine—that is to say, the starting and stopping of the mechanism and the mechanical actuation or movement of the printing devices when the latter are used. These controls are operated by some of the impulses of the sensing means—usually others than those that operate elements in Group 2. For the purposes of this specification, Element Group 3 is termed "machine controls".

The elements under Groups 1, 2 and 3 above each terminate in jacks conveniently grouped upon a plug board, and cords with a plug on each end are provided whereby the various jacks may be interconnected at the will of the operator so that any lower brush in 1 may be connected to any counter in 2 and so that circuits can be established between the upper and lower brushes which will include one or more of the machine controls 3.

The various Element Groups 1, 2, 3 of existing tabulating machines may therefore be connected together in various combinations. However, with such machines the accumulator means and printing bars (Element 2) can only be connected to one set of brushes. The magnets operating these registers and printing bars have the return wires therefrom permanently connected to the same side of the line as the contact roll which cooperates with the upper brushes. The other end of the winding of each of these magnets is led to a series of jacks. The contact roller cooperating with the lower brushes is connected to the opposite side of the line, to that of the contact roller of the upper brushes. In other words, if, for example, the contact roller cooperating with the upper brushes is connected to the positive side of the line or current supply, the contact roller cooperating with the lower brushes is connected to the negative side of the line. Therefore, as the return wires of the magnets operating the registers and the printing bars are permanently connected to the upper brushes these elements can only be operated when connected to the lower brushes. They cannot act upon each other, nor can they interact with the machine controls (Element Group 3), as they are designed to receive impulses rather than to set up paths within themselves to transmit impulses to other elements.

To cause the machine controls 3 to function, they must be included in a circuit including brushes in both sets, (upper and lower) and the relays associated with these controls cannot act upon each other. These elements are adapted to actuate contact arms within the machine. These contact arms are permanently connected or strapped together in series internally and connections from these straps are brought out to jacks so that one or more sets of contact arms may be included in the series. After being actuated by a magnet, or magnets, these contact arms are mechanically reset by cams within the machine. One (usually the end one) of these contacts is permanently connected within the machine to elements that control the operating and printing cycles of the machine. Therefore, as these relays are designed and so connected to the controls of the machine they cannot interact with the accumulators 2.

Examination of the circuits, when the machine is set up in any possible working combination, will reveal that original impulses set up by the sensing means travel directly to the operative controls of the accumulators 2 or directly to the machine controls 3. No combination of connections can be made whereby the different controls 2 may interact upon each other and the resultant effect of said interaction cause the machine to function or control; nor can any connections be made to produce this effect upon the controls 3; nor can any combination of 2 and 3 be obtained.

The accumulators 2 may be said to constitute one group of elements of the machine. They may add, subtract, operate counters of various types, set printing bars and the like as distinguished from the group of control elements 3 which control the starting, stopping of the machine, the feeding of cards therethrough, operation of printing mechanism and the like.

The improved control device herein described, which constitutes the invention, to distinguish from the control means of the prior art, is termed herein "master control unit", and contemplates the inclusion in the connecting means for the various elements of the machine (in this case in the cords before mentioned) of suitable relays, all circuit terminals of which are brought out so they may be connected in an almost infinite number of combinations to produce new and useful results. These relays may be of different types and degrees of sensibility, or adapted to operate in different degrees of time, in order to produce the desired control.

This master control when used in connection with a tabulating machine or other device constitutes a fourth group of elements, the other three elements thereof being those heretofore mentioned. Of course this fourth element need not be arranged in the cords, as above referred to. It can be placed anywhere, provided it is in changeable relation to the other elements and their existing controls. In other words, the relays of the "master control unit" may be conveniently grouped and all circuit terminals of each may be brought out to jacks and located so that the plugs of the cords before mentioned can be used to inter-connect the same with the elements in Groups 1, 2 and 3 of the tabulating machine.

It will be apparent from the following specification that the master control unit permits of having original impulses, set up by the sensing means, enter the operative magnet coils of the master control unit where they actuate contact arms and set up a circuit or path through which an impulse may pass. This impulse may be termed an actuating impulse and it may, for example, pass to elements 2 and/or element 3 of the machine. This impulse may be under the control of the sensing means, or may be originated elsewhere. It may originate from a hole in the record card nearer the top thereof, for example, a hole in the "1" row or the "0" row, so that the circuit through the master control will have time to be set up by holes in the lower rows of the card (9, 8, 7, 6, etc.), and may pass therethrough, or be controlled, modified or changed in character, in time, in value, therein, finally passing to the functional 2 and/or operative controls 3.

The modification of the impulse, character, time or value may be accomplished by some of the elements of the master control acting slowly, substituting other paths therethrough or substituting other impulses from the sensing means or from the original current supply as will more fully be described hereinafter.

Obviously, the flexibility of existing tabulating machines is limited to the number of interconnections possible between the groups of elements 1, 2 and 3 made possible by the plug and jack connections before mentioned as well as for other reasons that are apparent from the foregoing, and an object of this invention is to provide a master control unit whereby further sub-division of the connections between the various elements of a tabulating machine is effected, this control constituting a fourth group of elements, interposed in changeable relation (adapted to be switched or plugged at the will of the operator) in said connections adapted to control the existing controls or the impulses or electric currents flowing through the several circuits of the machine in order to increase the flexibility thereof and to enable the machine to be set up to secure numerous and various results heretofore impossible, or to perform known problems possible with existing machines with a saving in time.

A further object of the invention is the elimination of the sorting operation often heretofore necessary in order to obtain selected cards from which certain information is desired.

Another object of the invention is to prevent or permit impulses to flow in selected circuits of a control device, in order to provide automatic control therefor entirely under the control of the record used therewith. This is accomplished by having impulses from the sensing means under control of the record disable or enable selected circuits in the control device whereby other impulses from the record or some other source are prevented or permitted to flow therethrough to one or more elements of the machine.

Another object is to provide a master control unit whereby a predetermined combination of impulses or currents may be selected to control and direct a single operating impulse of current in order that the latter may function to produce a desired result. The predetermined combination of impulses from a record passing to the master control unit set up a circuit therein through which an operating impulse from the same record card may pass to an element of the machine to produce the desired result. Groups of record cards may be passed through the machine but only records having holes therein in accordance with the predetermined combination will set up the circuit for the operating impulses to pass through, therefore, record cards not having the predetermined combination upon passing through will not register.

A further object of the invention is to provide a device whereby the timing of the currents or impulses in record controlled devices may be apparently changed by the substitution of one impulse for another, thereby changing the numerical value thereof. For example, if it were desired to change the numerical value of an impulse from a column in the 9 row on the record card to a numerical value of 5 this could be accomplished by having the hole in a given column in the 9 row actuate a relay in the master control unit and set up a circuit through which an impulse of a value of 5 may pass, therefore substituting the 5 impulse for the 9 impulse.

Another object of the invention is the provision of one or more electrical devices which may be interconnected in a record controlled device at a point in the circuits thereof between the feed end or sensing means and the accumulating means and/or machine controls, to increase the usefulness of the device. One method of accomplishing this is to inter-connect electrical devices in the master control unit between the sensing means and the registering means and/or machine controls in such a manner that certain predetermined data corresponding to indicia in certain positions on some of the cards will register or accumulate and other indicia on some of the cards will actuate the machine controls and cause the machine to print.

Another object is to provide a master control unit adapted to control the functioning of a record controlled device by a series of key impulses whereby upon the passing of cards therethrough if any one of the key impulses fails to materialize the particular function does not operate.

Another object of the invention is to pass from records, impulses in an unknown order, to a device adapted to translate only the impulses from those records which pass impulses in a predetermined combination, without disarranging the order or sequence of the records, some of which may not be able to pass impulses in the said predetermined combination.

In order to define "selectivity" as employed in this specification and the appended claims, and to avoid a lengthy comparison of the method of selectivity herein disclosed with methods heretofore known, it is desirable to state that the prior art as previously referred to herein relative to tabulating machines contains examples of "selectivity" wherein the operator connects the desired elements 1, 2, 3 of the machine heretofore mentioned by suitable switching means such as plugs and cords or switches, and then feeds selected (previously sorted) cards to the machine, the machine performing its operations automatically under control of these selected cards only.

Several groups of selected cards may be placed in the machine at the same time and the "automatic control" (machine control) plugged to cause the machine to function as of each minor or major group individually.

Obviously, the selectivity so obtained is limited, and while it has been heretofore termed "automatic", should not be confused with "super-selectivity" as that term is hereinafter employed, as the type of selectivity herein referred to cannot be obtained by known devices, the various elements in Groups 1, 2, 3 of a tabulating machine being permanently connected internally as described above and always functioning in the same manner in accordance with the manual preselection of circuits and connections made.

For example, the operator of a tabulating machine may connect the sensing means 1 to be operated from certain columns on the card to a machine control 3 and at the same time connects certain accumulators 2 to be operated from certain other columns on the card. This is the limit of the selectivity of the machine. The accumulators cannot act on each other, nor can the control be affected by the accumulators. The cards must be arranged (sorted) to cause the machine to function in accordance with this set up, and the results are correspondingly limited.

By the use of the present known tabulating machines such problems as that herein given using unsorted cards and requiring automatic selectivity (in the sense that term is herein employed) cannot be solved for reasons that are apparent from the following specification.

Therefore, by "super-selectivity" is meant that degree of selectivity attained when the machine elements themselves connected up as described, automatically select by means of impulses under the control of the cards, some of which impulses will occur in known timing or sequence and some in unknown timing or sequence; the cards need not be sorted or disassociated from other cards from which no selection is to be made and the entire problem is solved in one operation of one machine.

The machine elements are, by the addition of the master control unit, controlled by the cards, automatically given various functions as distinguished from the fixed functions they possess in existing machines. The machine controls 3 and the accumulating means 2 may act upon each other, and the various combinations possible with the master control unit herein disclosed are almost infinite.

Other objects and advantages of the invention will be apparent from a preferred embodiment thereof and several examples of the uses thereof, as illustrated in the accompanying drawings in which:

Figure 2 is a circuit diagram showing a plug board and relays of the master control unit having all operative points terminated therein in jacks and comprising one form of master control unit device which may be used to carry out the invention;

Figure 3 is a front view of a preferred embodiment of the invention showing the arrangement of the jacks and switches thereof;

Figure 4 is a rear view of the device shown in Figure 3 depicting the arrangement of the elements within the master control unit;

Figure 5 is a section along the line 5—5 of Figure 4 showing one form of relay and the jacks associated therewith, in the master control unit;

Figure 6 is a section along the line 6—6 of Figure 4 showing a second form of relay and the jacks associated therewith;

Figure 7 is a section along the line 7—7 of Figure 4 showing a third form of relay and the jacks associated therewith, in the master control unit;

Figure 8 is a section showing another form of relay suitable for use in the device;

Figure 12:
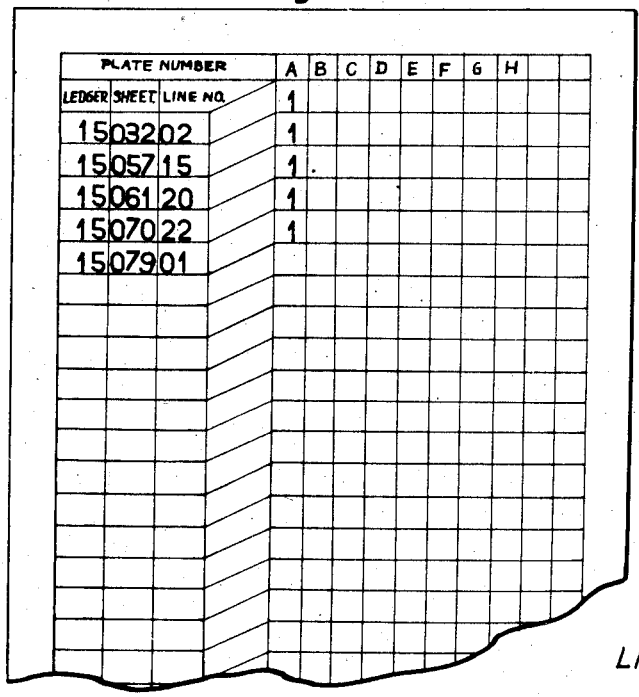
Figures 11, 13:
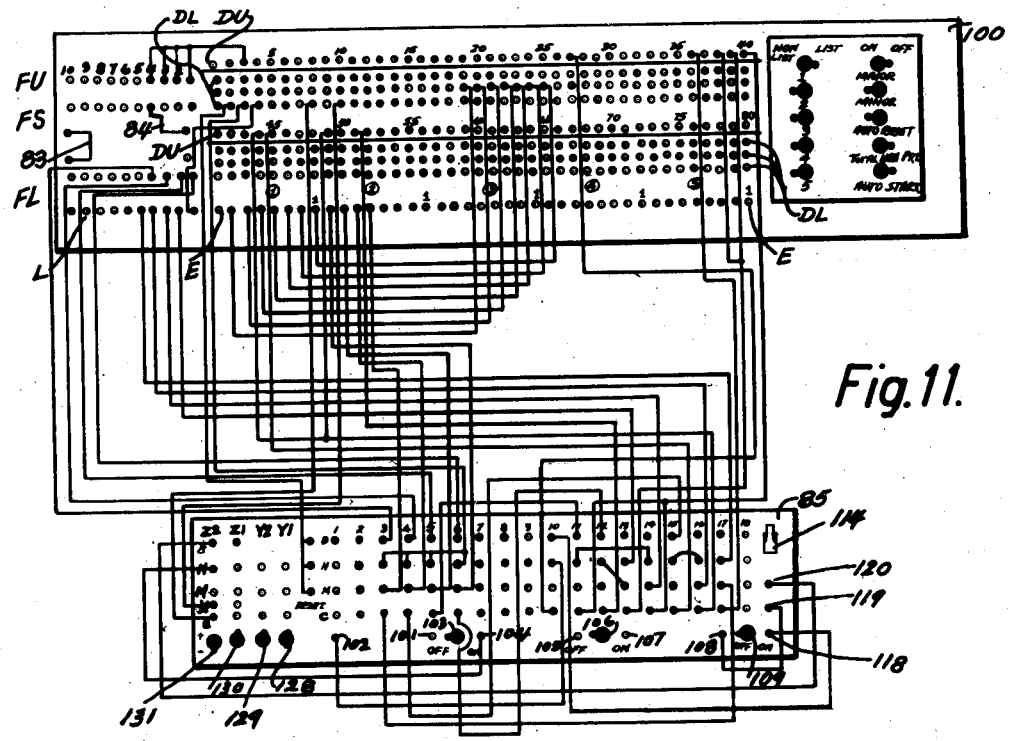

Figure 9 is an elevation of the lower part of a well-known tabulating machine showing the plug board thereof with a master control unit positioned thereon and constituting this invention wherein connections between the plug board of the device and the plug board of the tabulating machine, and the connections between some of the jacks of the sensing means and of the recording means on the tabulating machine are connected for the first problem given herein;

Figure 10 is a diagram of connections same as shown in Figure 9 except that the circuits of the relays of the master control unit, actually used in the first problem, are shown diagrammatically so that the circuits therethrough may be traced with greater facility;

Figure 11 shows the plug board of a tabulating machine, and the plug board of the master control unit connected up for a second and more complex problem;

Figure 12 is a suitable form of stencil list showing how the tabulating machine interconnected with the master control unit, records the results thereon in connection with the first problem given herein; and Figure 13 is the same form of stencil list as that shown in Figure 12, showing how the tabulating machine interconnected with the master control unit described and claimed herein, records the complex results thereon;

Figure 14 is a diagrammatic sketch showing a card feeding device, upper and lower brushes and a card receiving device constituting a sensing means; accumulating and printing devices constituting entry receiving means, and relays adapted to control the operating and printing cycles of the machine, constituting a machine-control means.

Two types of cards are in general use in tabulating machine work. One type has 45 vertical columns and the other has 80 vertical columns. Both types have 10 horizontal rows of numerals from 0 to 9 inclusive and sometimes two rows may be used above the 0 row. For illustrating this invention and the use of the same in connection with tabulating machines, a layout on an 80 column card is used, such as the one shown in Figure 1 wherein columns 1 to 12 inclusive are utilized to provide on the cards, impulses of known timing and value because they will be the same on all cards used as of the problems submitted.

Columns 16 and 17 may be used to designate the store. The year may be designated in column 18. Columns 19 to 27 inclusive are used for recording information about the customer, such as ledger, line, sheet, state, etc. Column 27 may be left open so that in the event a customer does not want advertising matter the 9 in this column may be punched and the control so connected that the name will not be selected.

Columns 28 to 52 inclusive represent the departments in the store and column 53 represents the total departments of the store in which purchases were made by the customer, during the months of February, March, April, May, June and July, the horizontal rows of numerals in these columns representing these months. For example, the row of 3s represents the month of February, the row of 4s represents the month of March, the row of 5s the month of April, etc.

Columns 54 to 78 inclusive represent the same departments as 28 to 52 and column 79 represents the total departments of the store in which purchases were made by the customer, during the months of August, September, October, November, December and January, the horizontal rows of numerals in these columns representing these months. For example, the row of 3s represents the month of August, the row of 4s represents the month of September, etc. Columns 53 and 79 have no reference to any totals of amounts of purchases, but merely represent the total departments in which the customer made purchases.

The two boxes formed at the top of the card above the oblique lines indicate the two six-month periods, and it will be noted that the box on the left contains the words "February–July" and the other box contains the words "August–January", indicating that the first six-month period begins with February and ends with July, and the second six-month period begins with August and ends with January. The horizontal row of 3's in the first six-month period corresponds to the month of February, and in the second six-month period corresponds to the month of August.

Column 80 is used for total number of departments in which the customer made purchases during the previous year or season. Although the card (Fig. 1) apparently shows two extra columns at the right hand edge it will be noted that they are not numbered at the bottom as the other columns are. They are filled in by hand and are placed on the card as a key to identify the horizontal rows of the card with months as will presently be described.

Figure 1:
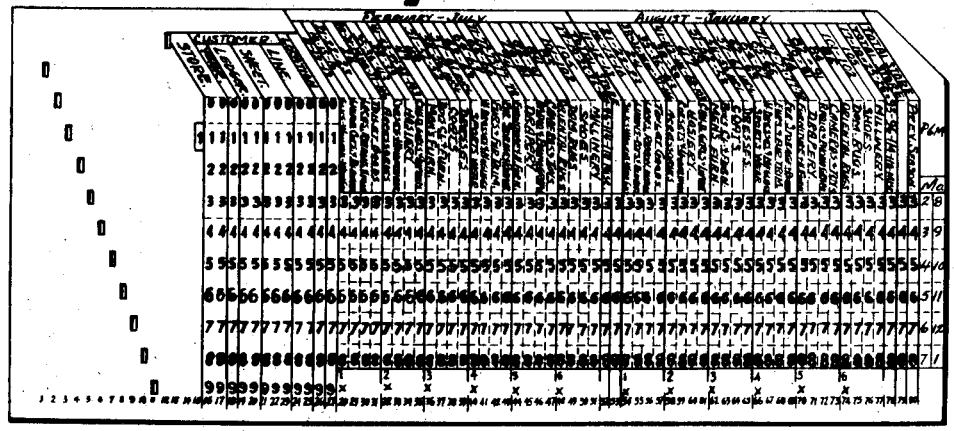
Figure 1 shows an eighty column tabulating machine card laid out in a form such as would be used by a department store and suitable for illustrating the invention.

One card is made up for each customer and the cards are punched, say, at the end of each month, for the activities during that month, as of digits and months rather than amounts of purchases. In other words by "activities" is meant the purchase of goods in the various departments, and on a given card of any customer if a purchase were made in any department, no matter how large or small it might be, a hole would be punched in that customer's card in the horizontal row representing the month and the vertical column representing the department. As to the digits and months, it will be noted from the card form that the digit 3 in the first six-month period represents the month of February, while the digit 3 in the second six-month period represents the month of August. The two columns added to the right hand edge of the card, beyond the eightieth column, are placed there as a key or guide in determining the months, the first of these columns having the numerals 2 to 7 therein, representing February to July, and the second of these columns having the numerals 8, 9, 10, 11, 12, 1, representing August to January. If it were desired to record the amounts of the purchases in the various departments a different card form would be used, but for the purpose of illustrating the invention a card of the form shown in Fig. 1 is herein described. No assembled data are shown on the card in the drawings because it is thought that the description of the method of recording the activities in the various departments, as will presently be described, will be more understandable and less confusing if no data is shown on the cards. If a customer makes more than one purchase in one department during a given month, only one hole can be punched in the position corresponding to the department and month, but this is entirely satisfactory as activity in the departments is all that is being recorded. In the Hollerith system, the cards travel through the sensing means in such a manner that the horizontal 9 row passes the brushes of the sensing means first, followed by the 8, 7, 6, etc. Therefore, if a hole is punched in the 9 row in any given vertical column and also, in for example the 7th and the 4th row in the same column, the 9 will register and the 7 and 4 will have no effect. By means of the improved device herein described this condition does not necessarily obtain. The value of any digit in any given row may be utilized, and unaffected by any other punched hole in the same column, as will presently be described.

The oblique columns at the top of the card have numbers placed therein, representing the numbers of the various departments, for example, 101—102 represents the shoe department as a whole, although 101 may stand for "sport" shoes and 102 for "dress" shoes.

Suppose the cards were for store No. 12, a hole would be punched in the 1 row in the 16th column and a hole punched in the 2 row in the 17th column, and in columns 18 to 27 inclusive the information about the customer would be punched.

Now suppose the customer represented by a given card had bought in the toilet goods, hosiery, shoe and millinery departments during the month of May; holes would be punched in the 6 row in columns 31, 34, 50 and 51.

Or if purchases were made in these same departments during the month of August the holes would be punched in the 3 row in columns 57, 60, 76 and 77.

In the existing tabulating machine (such as the one described in the patent to Lake et al., above referred to) the cards 200 (as shown in Fig. 14) are fed by a suitable card feed 187 into a sensing means which consists of an upper row of brushes 189 which contact with a roller 188, and a lower row of brushes 191 which contact with another roller 190. When the cards pass between the row of brushes 189 and the roller 188, no contact is made except at points where holes have been punched in the cards with a timing according to the row in which the punched hole occurs. After passing the upper brushes, the cards pass between the lower brushes 191 and their associated roller 190. This is the element heretofore designated (1).

The tabulating machine also has a series of adding dials or counter mechanisms, with a series of printing bars associated therewith. This element is heretofore designated (2). These instrumentalities are shown diagrammatically in Fig. 14 and designated generally by the numeral 199.

The machine also has a series of built-in machine controls. This is the element group heretofore designated 3.

To facilitate interconnecting, these elements of the tabulating machine terminate in a series of jacks in a plug board designated by the numeral 100 as shown in Figure 9.

The upper brushes are connected to the jacks DU numbered from 1 to 80 in fives and hereinafter a particular upper brush jack will be designated, for example, as DU5, meaning the jack connected to upper brush in column No. 5.

As the lower brushes (only) cause the accumulating and printing elements to function because the return wires from these elements are connected to the same side of the power line as the contact roller of the upper brushes which is of opposite polarity to the roll with which the lower brushes contact, these brushes are connected to a row of jacks, three jacks to each brush, each group of 3 being numbered from 1 to 80, designated as DL. These jacks are so arranged that the jacks from the lower brush in any given column are directly below the corresponding upper brush jacks. For example, the upper brush jack DU15 has its corresponding lower brush jacks DL15 located directly below and in line therewith. By means of the triple jacks any of the lower brushes may be connected to more than one instrumentality in the machine.

In order to keep the plug board, designated by the numeral 100, down to a minimum width, the rows of jacks DU and DL are made up into two groups with the jacks from 1 to 40 inclusive in the upper group and from 41 to 80 inclusive in the lower group, as shown in Figure 9. The eighty upper brushes 189 are arranged in one single row in the machine and they are so arranged that they register with the eighty columns in the record card. The eighty lower brushes 191 are arranged in the same manner and are positioned a distance equal to the height of a record card away from the group of upper brushes 189.

The magnets for effecting the control of the operative and printing cycles of the machine (shown diagrammatically at 192 in Fig. 14) terminate in two rows of jacks in the plug board 100 and are designated as FU and FL. The FU jacks are adapted to be connected to the upper brush jacks DU and the jacks FL are adapted to be connected to the lower brush jacks DL.

For a given control to function, its jacks must be connected—one to an upper brush jack and one to a lower brush jack—in order to complete the electrical circuit therethrough.

A plurality of shunt jacks FS form the terminals for a series of contact arms 194. These contact arms are actuated by the control magnets 192 and are reset by cams (not shown). These jacks are adapted to be plugged with a major control shunt 83 or a minor control shunt 84. One of the contact arms 194 (usually the end one) is connected to instrumentalities in the machine which cause the machine to continue to run or stop and print, etc. These instrumentalities (not shown in detail) are indicated generally by the numeral 195. These instrumentalities are connected via the wire 202 to the negative side of the source of current; they are connected via the wire 203 to the tabulating motor 197; connected via the wire 204 to the printing motor 198; and some of them are also connected to a shunt contact 194.

A series of jacks L are connected in common for convenience where several plugs must be connected together. For example, if it were desired to connect the upper brush jack 10 to four other FU jacks, a plug wire would be connected from the jack DU10 to one of the jacks in L, and plug wires could be run from four other jacks in the row L to the required four of the FU jacks.

Several banks of jacks are connected to a series of accumulators and/or printing bars (Element Group 2) and designated E, Figures 9 and 10, each bank containing eight jacks in the order of 1 to 8 counting from right to left and they may be connected by plugs to other jacks on the plug board, for example, to the lower brush jacks. The counter magnets, printing magnets and transfer mechanism is shown diagrammatically at 199 in Figure 11, and one jack E is also shown therein.

In one form of master control unit suitable for carrying out the invention, shown in Figures 2 to 8 inclusive, a plug board 85, Figure 2, is provided and has connected thereto a bank of relays. The terminals of all of the elements of these relays terminate in jacks and switches in the plug board 85. These relays are of three general types.

(Ra) A relay which opens one set of contacts upon receiving an impulse and causes a second set of contacts to "make" whereupon they remain in this relation until an impulse is sent through a reset coil thereof and contact between the second set of contacts is broken and the first set again makes contact, the contacts being oppositely disposed.

(Rb) A relay which holds a pair of contacts closed only during the life of an impulse.

(Rc) A relay with a slow acting coil and a fast acting coil, and having two pairs of contacts adapted to be closed by each of the coils alternately, each of which remains closed until broken by the action of the coil closing the other or opposite pair of contacts, the contacts being oppositely disposed.

Resistors or resistance units, shown in Figures 4, 5, 6 and 7 are not shown diagrammatically in Figure 2 for the sake of simplicity. However, resistance units may be used in series with the windings of the actuating magnet coils when the resistance of the latter is low enough to overheat if connected directly across the line, and in cases where the resistance of the coils is high, the resistors would not be necessary.

The plug board 85 with the relays and the connections thereto are shown diagrammatically in Figure 2 in which the relays R1 to R18 inclusive are of the type described in Ra above, the relays R19 and R20 are of the type Rb and the relays R21 and R22 are of the type Rc.

The relays R1 to R18 normally, as described in connection with R1 in Figure 2, have the contact arm 93 making contact with the contact arm 94 which is retained in this relation by the locking armature 96 until an impulse passing through the coil 97 attracts the armature 96 and allows the arm 93 to break contact with the arm 94 and establish contact with the contact arm 95 and remain in this relation until the reset coil 98 is energized.

The reset coil 98 pulls the arm 93 away from the arm 95 breaking contact therewith and again establishing contact with the arm 94, whereupon the spring 99 pulls the armature 96 up and locks the arm 93 in this relation.

The letters B, H, M and C, Figure 2, indicate certain rows of jacks on the plug board 85 and stand for "break", "hinge", "make" and "coil", respectively, and the numbers at the tops of the columns (1 to 18) each indicate a relay.

The contact arm 93 of relay R1 is connected to the jack H in column 1 of the plug board 85, and the corresponding contact arm of relay R2 is connected to the jack H in column 2, etc.

Likewise the contact arm 94 of the relay R1 is connected to the jack B in column No. 1 and the corresponding contact arm of relay R2 is connected to the jack B in column No. 2, etc.

The contact arms 95 of the relays R1 to R18 inclusive are connected to the jacks M in their respective columns.

Lead wires from each actuating coil 97 of these relays are connected to the jacks C in their respective columns, and the return wires of the actuating coils 97 are connected in common in groups:

One group comprising the return wires 207 from the actuating coils 97 of relays R1, R2, R3, R4, R5 and R6 inclusive are connected to the jacks 101 and 102 and to one side of a switch 103.

A second group comprising the return wires 205 from the actuating coils of relays R7, R8, R9, R10, R11 and R12 inclusive are connected to jacks 104, 105, to one side of the switch 106 and to the other side of switch 103.

A third group comprising the return wires 206 from the actuating coils of relays R13, R14, R15, R16 and R17 inclusive are connected to jacks 107, 108, to the other side of the switch 106, and to one side of the switch 109.

The connections for the other side of the switch 109 and for the return wire of the actuating coil in relay R18 will be described later as well as a certain function this last named relay is adapted to perform.

The switches 103, 106 and 109 are single pole and are open when thrown to the left, as shown in Figure 2, and closed when thrown to the right.

A connector cord 110 has a connector plug 111 for connection to the same source of power that supplies the tabulating machine. This cord leads current via the fuses 112, 113 to a double pole double throw switch 114, the back of which is shown diagrammatically at 115.

For the sake of illustration, the wire 116 is assumed to be of negative polarity and the wire 117 is of positive polarity, although these polarities may be reversed by means of the double-pole, double-throw switch shown at 114—115.

The wire 117 is connected to the jack 118 and to the other side of the switch 109.

The return wire of the actuating coil in R18 is connected to the wire 125 which is connected to 117.

By throwing the switches 103, 106 and 109 to the right, the return wires of the actuating coils in relays R1 to R17 inclusive are connected to 117 (which is of the same polarity as that of the upper brushes), and the connections (in this case) from the C jacks would be made to the lower brush jacks DL on the tabulating machine, as these are of opposite polarity to that of the upper brushes and should be so for current to flow through and operate the actuating coils in the relays. If the polarities of the brushes in a tabulating machine are opposite to those just stated, the actuating coils in the relays will not operate because there will be no potential difference across the terminals and by throwing the switch 114 to the opposite side, the polarities of these relays will be reversed with respect to the polarities of the brushes in the tabulating machine and the actuating coils would operate.

In some cases it is necessary to have some of the relays operated by the upper brushes also. Suppose one or more relays in the group R1 to R6 inclusive and in the group R13 to R17 inclusive is operated by the lower brushes, and one or more in the group R7 to R12 inclusive is operated by the upper brushes, switch 109 would be thrown to the right, connecting the actuating coil return wires of relays R13 to R17 inclusive to wire 117; switches 106 and 103 would be thrown to the left, disconnecting the other return wires from wire 117; a plug cord would be used to connect the jack 105, which is common with the return wires of the actuating coils of relays R7 to R12 inclusive, as above stated to jack 119 which would connect the actuating coil return wires of relays R7 to R12 inclusive to the wire 116 which is of the same polarity as the lower brushes in the tabulating machine; and a plug cord would be used to connect the jack 101 to jack 118, which would connect the actuating coil return wires of relays R1 to R6 inclusive to wire 117, which is of the same polarity as that of the upper brushes. The C jacks of the actuating coils of the relays in the group R7 to R12 would then be connected to the upper brush jacks DU and impulses thereover would operate the same, and the C jacks of the relays in group R1 to R6 inclusive and R13 to R17 inclusive would be connected to the lower brush jacks DL and impulses thereover would actuate these relays.

The wire 117 must be of a polarity opposite to that of the lower brushes.

If the connector plug is connected to the source of power to which the tabulating machine is connected and it happens that the wire 116 is of the same polarity as the upper brushes and the wire 117 is of the same polarity as the lower brushes the relays would not function as before stated, but reversing the switch 114 would make the polarities right, relative to the tabulating machine, and the relays would function.

The return wires of the reset coils 98 of the relays R1 to R17, inclusive, are shown connected in common with each other and to the wire 117. These return wires could just as well be connected to the wire 116 or be connected to a jack which could in turn be connected to either side of the line (116 or 117), but as it is convenient in the problems illustrating the invention to have the resetting of these coils operated by a lower brush the connection above stated is shown. However, other relays in the master control unit are arranged so that the reset coil return wires are individually connectible to either side of the line, as will presently be described.

The cable 121 connects to one side of each of the reset coils 98 of relays R1 to R9 inclusive and also to the jack 123, and may be plugged into any brush jack in the plug board 100 of the tabulating machine, for example, one of the lower brush jacks connected to a brush adapted to contact through a punched hole in a card for timing the reset operation.

A second cable 122 connects to one side of each of the reset coils 98 of relays R10 to R18 inclusive and may be plugged into the jack 123 whereupon these reset coils would operate in unison with those connected to the cable 121.

If relays in the group R1 to R9 only are being used, the cable 121 would be plugged into the proper column in the plug board 100 of the tabulating machine and the cable 122 would be plugged into the jack 124 (which does not connect to any circuit) to keep the cable from dangling on the floor. This would not allow the reset coils in relays R10 to R17 to operate, with a saving in wear.

Likewise if the relays R10 to R18 only are being used, the cable 122 would connect to the proper column in the tabulating machine plug board 100 and the cable 121 would be plugged into the jack 124.

A condenser 134 may be connected from (the connection to) cable 121 to the wire 133, and likewise a condenser 135 may be connected from (the connection to) cable 122 to the wire 133. These condensers are provided so that in case a condenser is used in the tabulating machine connected across the impulse distributor to prevent sparking therein, this condenser will not be overloaded.

Relays R19 and R20 are of the type Rb referred to above in which the actuating coil thereof holds a pair of contacts closed only during the life of an impulse. These relays, shown at R19 and R20 in Figure 2 are connected to jacks in the columns Y1 and Y2 respectively. For convenience the description is made in connection with relay R20, but it also applies to R19. A contact arm 125 connects to the jack in the H row in column Y2. This arm, when the magnet 127 receives an impulse, is attracted and contact is made with the arm 126 which is connected to a jack in the M row in column Y2.

One end of the magnet coil is connected to the jack in the C row under column Y2. The other end of this magnet coil is connected to the center contact of a single pole double throw switch 129.

The single pole double throw switches 128, 129, 130 and 131 each have one side thereof connected to the wire 117 via the wire 132, and each opposite side thereof connected to the wire 116 via the wire 133, so that (using 129 for an example) the actuating coil 127 may be operated by either the upper or the lower brushes. Assuming the same polarities as described above, suppose it is desired to operate this coil by means of an upper brush, in which case a plug wire would run from the C jack in the Y2 column to an upper brush jack DU and the switch 129 would be thrown "up" as shown in Figure 2. The return circuit may be traced as follows: from the switch 129 to the wire 133 to the wire 116. If it is desired to operate this actuating coil 127 by means of a lower brush, the C jack in the Y2 column would be plugged to one of the lower brush jacks DL and the switch 129 would be thrown "down" (opposite to its position shown in Fig. 2). In this case the return wire may be traced from the switch 129 to the wire 132 to the wire 125 and to the wire 117.

The relays R21 and R22 are of the type Rc referred to above, each having a slow acting coil and a fast acting coil, a pair of contacts associated with each coil and adapted to be operated alternately by each of the coils, one pair of contacts remaining closed until broken by the action of the coil closing the other or opposite contacts—thus when one pair of contacts is closed, the other pair is open.

These two relays are connected to the jacks in the columns Z1 and Z2. For convenience the description is made in connection with the relay R21, but it also applies to R22. The contact arm 135 is connected to the jack in the H row in column Z1, the contact arm 136 is connected to the jack in the B row in column Z1, and the contact arm 137 is connected to the jack in the M row in column Z1. The fast acting magnet coil 138 has one end connected to the wire 132, which in turn connects to the wire 117, and its other end connected to the jack in the X row in column Z1. The slow acting magnet coils above referred to consist of magnet coils having windings thereon with a short length of the core extending beyond the winding. A heavy copper washer or slug is placed on the core. This slug retards the building up of magnetic flux in the core and as such coils are well-known in the art they are not herein described in detail. The slow acting magnet coil 139 has one end connected to the jack in the C row in column Z1 and its other end connected to the center contact of a single pole double throw switch 130. One side of the switch 130 is connected via the wire 133 to the wire 116, which is one side of the line from the connection plug 111, and the other side of the switch is connected via the wire 132 to 117 which is the other side of the line, and by means of this single pole double throw switch, one end of the magnet coil 139 may be connected to either side of the line desired.

When the magnet coil 138 operates, due to an impulse from the tabulating machine passing thereto via a cable plugged into the X jack in column Z1 and via the wire 132 to the side of the line of opposite polarity to that of the source of the impulse, the contact arm 135 is attracted and contact is established with the arm 136, thus closing the circuit across the jacks H and B in the Z1 column, at the same time the spring 141 pulls up the lever 140, thereby locking the arm 135 in this position.

An impulse via the jack C in the Z1 column energizes the coil 139 and the lever 140 is pulled down, releasing the contact arm 135 whereupon it makes contact with the arm 137, thus closing the circuit across jacks H and M in the Z1 column.

Although the magnet coil 138 is described as "fast" acting and 139 as "slow" acting, it is obvious that they could both be of the same speed and either fast or slow acting without departing from the invention. And any of the relays R1 to R18, inclusive, may have the reset coil return wire thereof arranged with the switch, such as is shown at 128 to 131, inclusive, so that the reset operation may be accomplished by either an upper or a lower brush, and independently of the resetting operations of other relays in the device.

In a preferred form of the invention, shown in Figures 3, 4, 5, 6 and 7, relays R1 to R18 inclusive, of the type Ra, above described; R19, R20 of the type Rb; and R20 and R21, of the type Rc above described, are mounted on a suitable strip of material 166, supported behind the panel 85 by end pieces 171 and 172.

These relays have their coils, contact arms, and switches connected as shown diagrammatically in Figure 2 with the exception that a flush receptacle 163 is provided so that the connector cord 110 may be detached from the master control unit making the same easier to handle.

Suitable top, back and bottom plates 168, 169 and 170, member up with the front panel 85 and the end plates 171 and 172, and thereby form a dust-proof casing for the elements of the master control unit.

Suitable supports 161, 162 which may be made in any desired form are provided for supporting the master control unit in convenient relation to the plug board of a record controlled device, for example, these supports may be hooked over the opened door 173 of a tabulating machine as shown in Figure 9 and the jacks in the plug board 100 and the jacks of the plug board 85 of the control unit may be interconnected in any desired arrangement.

An alternate form of relay suitable for use in the master control unit is shown in Figure 8 in which an arm 174 pivoted on the jack 175, and shown in the reset position makes contact with an extension of the jack 176. The arm 174 has a strip of insulating material 180 set in and adapted to support a back strip 181. This last strip is made preferably of hardened steel, and has its lower end in the shape to form a knife edge. The knife edge is engaged by a hook shaped member 183 which is also preferably of hardened steel and which is carried by the armature 182.

The actuating magnet coil 178, which may be made in any suitable form is adapted, when energized by an impulse via the jack 186, to pull the armature 182 down and release the knife edge from the hook 183, whereupon the lever 174 breaks contact with the jack 176 and makes contact with the jack 177 due to the tension of the spring 185.

The reset armature 184, shown slightly distorted in Figure 8 as to its normal position, is attracted by the reset magnet coil 179 when an electrical impulse passes therethrough, whereupon the lever 187 bears upon the strip 180 and causes the arm 174 to assume its original position (as shown in Figure 8).

Having described an embodiment of the invention, some examples of its use in connection with a tabulating machine will now be given to show the increased flexibility of these machines and the consequent saving in time and the number of times the cards must be handled when the master control unit is interconnected with the elements of such machines.

Suppose it is desired to print a list of selected stencil numbers for addressing envelopes and indicate that these stencils will apply to a "Letter A" which will be mailed to all customers who have purchased in the hosiery department and the dress department and corset and underwear department, but who have not purchased in the house dress and negligee department during the months of April, May or June only.

Heretofore, the method of accomplishing this result has required the following steps:

(a) The sorting machine is set up with its selector arranged to function only on digits corresponding to April, May and June, and its brush is set for the column on the card corresponding to the first of the three departments. All of the cards are then run through the sorting machine. The cards selected by the sorting machine in this run are again run through the sorting machine (its brush having been set for the second department). The cards selected by this run of the sorting machine are again passed through the machine with its brush set to the column corresponding to the third department. The result of this series of sortings will be the cards of those who bought in the three departments in these months.

(b) Run the selected cards through the sorting machine again to eliminate those who did buy in the fourth or last named department. The result of this sorting is two groups of cards, namely:

"Wanted" cards—those who bought in the first three mentioned departments and not in the fourth department, and Those who bought in all four departments. The latter are not used, and (c) The "wanted" cards are run through a tabulating machine to print a list thereby accomplishing the desired result.

(d) After obtaining the result all of the cards are re-sorted and arranged in their original order or sequence.

By use of the master control unit herein described in connection with the elements of the tabulating machine, the same problem is accomplished in the following manner:

(a) All of the cards are run through a tabulating machine which rejects data from every card not wanted, and makes the desired selections, gives the result (c) without requiring re-assorting and arrangement (d).

In accomplishing this new result the cards are not disarranged in any way and remain in their original order or sequence.

The present tabulating machine has its relays permanently associated with other apparatus from which they can not be disconnected; this invention contemplates the employment of disassociated relays as hereinbefore described.

Using the master control unit in connection with the tabulating machine in the problem just given, the actuating coil of one relay thereof is connected by means of a plug wire to brush jack DU34 corresponding to column 34 used for the hosiery department. If a punched hole appears at the upper brushes in this column the contacts of this relay will at that time be closed.

The actuating coil of a second relay thereof is connected to brush jack DU39 corresponding to column 39 used for the dress department. If a punched hole appears at the upper brushes in this column the contacts of this relay will at that time be closed.

The actuating coil of a third relay thereof is connected to brush jack DU33 corresponding to column 33 used for the corset and underwear department. If a punched hole appears in this column the contacts of this relay will at that time be closed.

The actuating coil of a fourth relay thereof is connected to brush jack DU41 corresponding to column 41 used for the house dress or negligee department. If a punched hole appears at the upper brushes in this column the contacts of this relay will at that time open.

The contacts of these four relays are connected in series so that if the first, second and third relays are actuated (due to purchases in the corresponding columns) and the fourth relay is not actuated, a known or what may be termed an "actuating impulse" will pass therethrough and the desired result is obtained. The action of these four relays is further limited by two other relays which permit them to function when punched holes appear in horizontal rows corresponding to April, May and June, which, in this case, are the 5, 6 and 7 rows.

If all four relays are actuated no result is obtained because the fourth relay breaks contact, leaving the circuit open and thereby preventing the actuating impulse from passing from the sensing means to a relay 192 in the control section of the tabulating machine which breaks the control circuit and causes the printing mechanism to operate.

The foregoing is given to show that by this improved method the number of operations in connection with a given problem may be reduced from four to one. The actual operation of the machine previously described will now be given.

The diagram of connections for this problem is shown in Figure 9 and a circuit diagram shown in Figure 10 shows the relays used and the action of the circuits.

Jacks DL19 and DL20 are connected to E1—7 and E1—6 respectively to print the ledger number. Jacks DL21, DL22 and DL23 are connected to E1—5, E1—4 and E1—3 respectively to print the customer's sheet number, and jacks DL24 and DL25 are connected to E1—2 and E1—1 respectively to print the line number upon which the customer's name appears. Ledger, sheet and line number together constitute the identification of the customer. These connections just referred to are from and to points located in the plug board 100 of the tabulating machine.

From the card, Figure 1, it will be noted that for the months of February to July inclusive, the hosiery department is located in column 34, the dress department is located in column 39, and the corset and underwear department is located in column 33, so plugs from DU33, DU34 and DU39 on plug board 100 are connected to jacks C in plug board 85 in columns 7, 8 and 9, respectively, which, referring to Figures 9, 10 and 2, lead to the actuating coils 97 of relays R7, R8 and R9.

The jack in the M row, in column 7 on plug board 85 which will be called M7, is connected to H8, M8 is connected to H9, and M9 is connected to H10, so that when all three of the relays 7, 8 and 9 operate, a circuit is completed from H7 to H10. This may be easily followed by referring to Figures 9 and 10. When the relays R7, R8 and R9 operate, assuming for the time being that the other sides of these coils are connected directly to the side of the line of opposite polarity to that of the upper brushes, the contact arms 93 in these three relays move to the right and make contact with the contact arms 95 and a circuit can be traced from H in R7 to H in R10.

From the card, Figure 1, it will be noted that for the months of February to July inclusive, the house dress or negligee department is in column 41, so a plug connection is made from DU41 in plug board 100 to the jack C in column 10 in plug board 85 which is the same as connecting it to the coil 97 in relay R10 (Figure 10).

The jack B10 is connected to jack C4, and H7 is connected to DL4 (in plug board 100) so that an impulse (hereinafter termed "actuating impulse") from the lower brush, due to a punched hole in column 4 of the card, will pass via the plug cable to H7, via the contact arms 93, 95 in relay R7 to M7, via the cable from M7 to H8, via the contact arms 93, 95 in relay R8 to M8, via the cable from M8 to H9, via the contact arms 93, 95 in relay R9 to M9, via the cable from M9 to H10; and, if the relay R10 has not been actuated because the customer did not buy in the house dress or negligee department and no hole appears in column 41 of the card, the impulse passes from H10 via the contact arms 93 and 94 of relay R10 to B10 and via the cable from B10 to C4, thereby energizing the actuating coil 97 of the relay R4, thereby breaking the control circuit of the tabulating machine as will be presently described.

Due to the presence of a punched hole in column 41 of a card passing through the tabulating machine, the coil 97 in relay R10 is actuated and the contact arm 93 breaks contact with the arm 94, in which case the impulses sent out by DL4 do not reach the coil 97 in relay R4 as there is no circuit therethrough, this being broken between 93 and 94.

For controlling the machine a plug connection is made from the jack DU3 to the right hand jack in row FU, and ordinarily a connection would be made from DL3 to the corresponding end jack in row FL, but since it is desired that the machine break control and print only when the conditions of the problem are fulfilled as described above, the contact arms 93, 94 of relay R4, terminating in the plug board 85 as H4 and B4 respectively, are connected in series with DL3 and the end jack in the row FL, by a plug cable from DL3 to H4 and a cable from B4 to the end jack in row FL, so that when the coil 97 in relay R4 is actuated by the impulse from DL4 via the relays R7, R8, R9 and R10, (the conditions above referred to corresponding to the problem having been fulfilled) the contact arm 93 breaks contact with the arm 94, thereby opening the circuit between DL3 and the end jack in FL, and causing the machine to stop and print.

But the conditions of the problem are that these purchases apply to the months of April, May or June only. This is taken care of by the relay R22. The return wires from the other sides of the coils 97 in relays R7, R8, R9 and R10 are connected by means of a plug wire from the jack 104 to the H jack in column Z2 and switches 103 and 106 are thrown to the "off" position. A plug cable connects from the B jack in column Z2 to the jack 120 which is of opposite polarity to that of the upper brushes in the tabulating machine.

The magnet coil 139 of relay R22, via the jack CZ2, is connected to DL7 and the coil 138 thereof, via the jack XZ2, connected to DL9, the 7 column on the card corresponding to the month of April and the 9 column corresponding to the month of June, so that the presence of a hole in column 9 on the card causes arm 135 to make contact with the arm 136, whereupon the return wires of the coils 97 in relays R7 to R10 inclusive are connected to the line until an impulse emanating from a hole in column 7 in the card actuates the coil 139, thereby breaking the contact between arms 135 and 136 and rendering the relays R7, R8, R9 and R10 inoperative. Therefore, with this arrangement a card meeting all conditions of the problem, except the months, does not cause the machine to register or print. The shunt plug 84 is connected to the end jack in the shunt jacks, row FS, and the major shunt plug 83 is connected as shown. The switches on the plug board 100 are connected as shown with the first group of counters E1 on "list" and E2 on "non-list", and with "minor control", "automatic reset", and "automatic start", in the "on" position.

These switches are shown and described in the Lake Patent No. 1,775,132, above referred to, and are illustrated in Figure 1 of said patent and Figures 10, 10ᵃ and 10ᵇ, the latter of which constitute circuit diagrams of said machine. If it were desired to list every record which passed through the sensing means, the switches of the plug-board 100 could be thrown to "List", in which event the identification of all records would be printed and the information (in columns A, B, C, D, etc.) would be printed for only those records meeting the conditions of the problem. However, in the description, the machine is set to list only those records which meet the conditions of the problem E1 being set on "list" and the other accumulators on "non-list", and the "minor control" and "automatic reset" switches being in the "on" position.

A plug wire from the jack M4 to the printing bank jack E2—1 is provided and this bank prints a 1 in the column A of the form provided for that purpose, such as that shown in Figure 12, and the printing bank jacks E1—1 to E1—7 inclusive, connect to printing members which print the ledger, sheet and line numbers, as before mentioned.

It will be noted that in this form the lines are stepped upward. The reason for this is that the numeral 1 is printed in the A column due to a total taking operation instituted as follows: The machine having been set for tabulating or non-listing operation, and assuming that the machine is operating and feeding cards, when a card which satisfies the requirement of the particular problem is sensed by the upper brushes, the circuit to one of the group control relay magnets is broken and at the same time a unit is entered into one of the accumulator wheels. During the total taking cycle initiated by the breaking of one of the group control relay magnets, this unit is read out of the accumulator, and as the printing magnet to which the read-out device (55 in Figures 6 and 10ª of Patent No. 1,775,132) is connected, it causes the figure or symbol 1 to be printed on the paper which is in line with the type at that instant. During the second half of the total taking cycle, the accumulator is reset and a line spacing operation occurs.

This total taking and reset cycle also closes group indicating contacts in series with the printing bank which prints the customer's identification or stencil number when the card which initiated the total taking cycle is sensed by the lower brushes on the first tabulating cycle following the total taking cycle just described.

The card having stopped between the upper and lower brushes during the total taking cycle, the customer's identification or stencil number is printed one line space below the 1 identifying the letter selected due to the line spacing operation just described which followed the total taking operation. At the end of this first tabulating cycle, these group indicating contacts are opened and remain in this state until the next total taking cycle occurs, so that no printing can take place until the next card satisfying the requirements is sensed by the upper brushes.

It is possible to print all of the numerals on the same line, but this involves slightly more complications and will not here be described.

From the record card, Fig. 1, it will be noted that the known impulse in the second column of the card has a value of 0. An impulse from this position may be used to reset any relays which have been actuated during a card cycle. Of course, the relays could be rest with an 11 timing (the first column in the card) or a 12 timing (the twelfth column of the card), but the 0 timing is set for this purpose as all of the holes of any numerical value have passed the brushes by the time the 0 reaches them. As some of the relays used are in the group R1 to R9, and others of the relays used are in the group R10 to R18, the plug 122 is plugged into the jack 123, thereby connecting all of the reset coils of the relays in common with the cable 121, and the cable 121 is plugged into a lower brush jack DL2, for column 2, so that as every card passing through the sensing means reaches the 0 index point position, all of the relays in the master control unit have their reset coils energized, whereupon they are reset.

After running all of the cards through the tabulating machine the desired result is obtained in one operation without sorting or disturbing the arrangement in any way.

It will be observed from the foregoing description that a machine employing this "Master Control Unit" in addition to the ordinary controls for elements 2 and 3 functions in an entirely different manner from known machines, particularly in respect to determining from any one card whether or not purchases were made in three certain departments, the impulses from these columns on the card being termed "month" impulses. These establish a circuit through which an "actuating" impulse may pass. By reason of a relay controlled by a fourth department, "month" impulse, the circuit previously established may or may not be disabled. If this circuit is disabled the machine will not function as the actuating impulse from the hole in the 2 row column 4 cannot pass to the elements 3 of the tabulating machine. This feature is independent of the time relation of the "month" impulses on the card as it passes through the sensing means. For example, the hole in the column (if one appears) representing the fourth department, might pass through the sensing means ahead of the holes representing the other departments. In other words, the holes causing the "month" impulses representing the four departments, do not have to pass through the sensing means in any particular sequence and regardless of how they pass through the sensing means, a circuit will be set up representing three departments. If purchases were made in the fourth department holes appearing in this column will cause this circuit to be broken, and the "actuating" impulse (which is originated by the 2 hole in column 4 of the card) cannot pass to a relay which breaks the control circuit and institutes a total taking operation.

It will be understood that the cards are fed into the machine with the horizontal 9 row first, so that the "actuating" impulse holes (such as that in the 2 row column 4) always pass through the sensing means after the month impulses.

It will also be evident that if the customer failed to purchase in any one of the first three departments, that the circuit would not be set up, and that the "actuating" impulse could not cause the accumulating means to function.

In the next problem, the diagram of connections of which is shown in Figure 11, several results are obtained with one handling of the cards.

Suppose the store desired to print from one run of the cards a stencil list of selected names for mailing letters A, B, C and D, but omit the names of all customers who have requested that no advertising be sent to them through the mails, the selections to be made as follows:

Letter A—To customers who have bought dresses or coats at any time during the season but who have not bought millinery during May, June or July;

Letter B—To customers who have bought sportswear at some time during the season but not during the months of May, June or July;

Letter C—To customers who have bought furniture or domestic rugs, but who have not bought draperies this season;

Letter D—To customers who have bought men's furnishings this season;

with the provision that those who have requested that no mail be sent them, be omitted. This provision is taken care of by a punched hole in the 9 row of column 27 in a manner which will be presently described.

To make the explanation of the connections in this problem more understandable, the description is made in steps, the connections for each letter being described successively. But when the connections are made and the cards run through the multiple result is obtained in the one run therethrough.

It is possible for one name to be selected for more than one letter, in fact one name would be selected for all of the letters if the card had holes punched therein filling all of the conditions of the problem, and the indications would all be printed on one line (in the A, B, C, D columns as shown in the last line in Figure 13), instead of being scattered through the list.

In the plug board 100 of the tabulating machine the jacks DL19, DL20, DL21, DL22, DL23, DL24 and DL25 are connected directly to E1—7, E1—6, E1—5, E1—4, E1—3, E1—2 and E1—1 respectively to record the ledger, page and line number.

The machine control section is next connected up by plugging the minor control 84 into FS4 of the shunt jacks. By means of a branch plug wire the upper brush in the third column DU3 is connected to FU1, FU2, FU3 and FU4, since the control circuit must be broken to cause the machine to stop and print, and since it is desired to print as of four different conditions (indicating which of the four letters is or are selected) four of the relays of the type Ra are connected by means of plug wires to the jacks FL1, FL2, FL3 and FL4 in which the other side of the windings of the first four magnets of the control terminate. Referring to Figure 11 it will be noted that relays 3, 4, 5 and 6 are used in this connection. These relays are shown diagrammatically as R3, R4, R5 and R6 in Figure 2 and it will be noted that the contact arm 93 normally makes contact with the arm 95 thus closing a circuit from B to H in each respective column.

To include these relays in the circuit (FU1 to FU4 inclusive, having been connected to DU3), FL1 is connected to B6, FL2 is connected to B5, FL3 is connected to B4, FL4 is connected to B3, and H3, H4, H5 and H6 are connected by means of a branch plug wire to DL3 which is the lower brush in the third column.

The operation of any (one or more) of these relays will break the control circuit and cause the machine to stop and print, and plug wires connect M3, M4, M5 and M6 to E2—5, E2—6, E2—7 and E2—8 respectively so that when any one of these relays operates, contact is broken between H and B and contact is established between H and M. For example if relay 3 operates, contact breaks between B3 and H3 and contact is established between H3 and M3, the latter being connected via a plug wire to the accumulator jacks E2—5.

The connections to the C jacks of the actuating coils 97 of these relays will be described as applied to each portion of the problem, and the return wires of these coils are connected by a plug wire from jack 102 to H10, and B10 is connected by a plug wire to the jack 118 (which connects to the side of the power source of opposite polarity to that of the lower brushes).

The relay 10 normally has its arms 93, 94 contacting across B and H, so that the return wires of the actuating coils of relays 3, 4, 5 and 6, are connected to an opposite polarity to that of the lower brushes.

The actuating coil of relay 10 is connected by a plug wire, from C10 to DU27 so that a punched hole in column 27 of a card (put there because the customer requested that no mail be sent out) would send an impulse through the actuating coil of relay 10, the contacts across B10 and H10 would be broken, and the actuating coils of relays 3, 4, 5 and 6, would be disabled and that particular card would not be selected.

The major control 83 is rendered inactive by plugging as shown in Figure 11.

In connection with that portion of the problem relating to the "Letter A" which will be sent to customers who have bought dresses (column 39 on the card) or coats (column 38 on the card) at any time during the season, but who have not bought millinery (column 51 on the card) during May, June, or July, jacks DU38 and DU39 are connected by means of a branch plug to C13 (which is the actuating coil of relay 13), and the jack DU51 is connected to C12 (the actuating coil of relay 12).

Jack DL4 is connected to one of the jacks in the common or bus section L (for example L1) whereby any of the other "L" jacks may be plugged into, whereby an "actuating" impulse emanating from a punched hole in the fourth column may be delivered to a plurality of points.

A plug wire leads from the jack L2 to H13, M13 is connected to H12, and B12 is connected to C6, so that if the relay 13 is operated and relay 12 is not operated, an actuating impulse can pass from DL4 via L1, L2 to H13, via the contact arms of the relay 13 to M13, from M13 to H12, via the contact arms of the relay 12 to B12, and from B12 via the plug wire to C6 whereby the relay 6 will operate, breaking control and causing the machine to take a total and print a "one" via the printing bank E2—8, and the other information (ledger, sheet and line) from columns 19 to 25 inclusive of the card by means of the printing banks E1—7 to E1—1 inclusive, listing the same card when it reaches the lower brushes.

The return wires from the actuating coils of relays 13 to 17 are connected together and to jacks 107 and 108 so, since relay 13 is operated from the upper brushes, a plug wire is used to connect the jack 108 to the jack 119 which is of opposite polarity to that of the upper brushes.

The connections for the return wire of the actuating coils of relay 12, as well as the return wire of the actuating coils in the relay 11, will be presently described showing how they can be actuated only as of the months of May, June and July.

In connection with that part of the problem relating to the "Letter B" which will be sent to customers who have bought sportswear (column 40 on the card) this season but not during the months of May, June and July, the jack DU40 is connected by means of a branch plug to jacks C11 and C14 which lead to the actuating coils of relays 11 and 14 of the master control unit. The jack M14 is connected by a plug wire to the jack L3 of the common bus (which is adapted to receive an actuating impulse from DL4 as above described).

The jack H14 is connected by a plug wire to H11 and B11 is connected by a plug wire to C5, the actuating coil of relay 5 (previously described), and a plug wire from L3 to M14 may lead an "actuating impulse" to M14, and this impulse will pass from M14 via the contact arms 95, 93 of relay 14 to H14, via plug wire to H11, via contact arms 93, 94 of relay 11 to B11, and via a plug wire to C5 (the actuating coil of relay 5), if a hole in column 40 has actuated relay 14 but has not actuated relay 11, due to no purchases during May, June and July, and if the actuating coil of relay 5 has not been disabled by the relay 10 due to a punched hole in column 27 as previously explained, the relay 5 is actuated thereby breaking control, and an impulse is passed via the plug wire from M5 to E2—7.

Relays 11 and 12 are controlled as of May, June and July as follows: The return wires of the actuating coils in relays 7 to 12 are connected together and to jacks 104 and 105. Jack 104 is connected by a plug wire to HZ2 and a plug wire connects MZ2 to jack 120 which has a polarity opposite to that of the upper brushes so that when the contacts across HZ2 and MZ2 are closed by the coil 139 of the relay R22 due to a punched hole in column 10 in the card sending an impulse from DL10 via a plug wire to XZ2, the return wires of the actuating coils of relays 7 to 12 are connected to the side of the line of opposite polarity to that of the upper brushes and an impulse to that actuating coil of any relay in this group would operate the same, for example, an impulse from DU51 via the plug wire to C12 would actuate the relay 12.

An impulse due to a hole in column 8 of the card from DL8 via the plug wire to CZ2 and to the coil 138 causes the arms 135 and 136 to break contact with each other, thereby disconnecting the return wires of the actuating coils of relays 7 to 12 inclusive from the line so that an impulse, at that time, cannot pass through these coils.

From the card it will be seen that a punched hole in column 8 appearing in the horizontal 6 row of the card corresponds to the month of May and a punched hole in column 10 appearing in the horizontal 8 row of the card corresponds to the month of July, so the control as of these months is taken care of by connecting the return wires of the actuating coils in this group to the other side of the line by means of an impulse emanating from a punched hole in column 10 corresponding to the month of July and, by disconnecting them by means of an impulse emanating from a punched hole in column 8 corresponding to the month of May, and holes punched in the wanted columns in rows corresponding to other months, have no effect upon the machine.

The connections for the next portion of the problem relate to a "Letter C" which is to be sent out to customers who have bought furniture, column 44 on the card, or (not and) domestic rugs, column 49, but who have not bought draperies, column 45 this season.

A branch plug wire connects from DU44 and DU49 to C16 which leads to the actuating coil of relay 16. A plug wire connects DU45 to C15 which leads to the actuating coil of relay 15. A plug wire connects the bus jack L4 to M16, H16 is connected by a plug wire to H15, and B15 is connected by a plug wire to C4 which leads to the actuating coil of relay 4 and the jack M4 is connected by a plug wire to the counter jack E2—6.

A hole occurring in either column 44 or 49 or in both 44 and 49 would cause an impulse to pass via C16 to the actuating coil of relay 16 closing the contact arms across M16 and H16, and an actuating impulse emanating from column 4 of the card would pass from DL3 to the bus jacks L, from L4 to M16, from M16 via the contact arms of relay 16 to H16, from H16 to H15, from H15 via the contact arms of relay 15 to B15 (if relay 15 has not operated due to a punched hole in column 45), from B15 to C4, whereupon the relay 4 would operate thereby breaking the control circuit between H4 and B4 and establishing a circuit across H4 and M4. The control circuit being broken, no impulse can flow from DL3 to FL3, therefore instituting a total taking operation and the machine would stop feeding records and print a total of "one" via E2—6 in the C column of the form shown in Figure 13, and the ledger, sheet and line number would print at the beginning of the next card cycle.

If a punched hole had also appeared in column 45 of the card showing that the customer had bought draperies, the relay 15 will have operated in which case the actuating impulse would not pass to the relay 4, the control would not be broken and that particular card would not be selected.

In the connections for that portion of the problem relating to a "Letter D" which will be mailed out to those who have bought in men's furnishings (column 36 on the card) this season, relay 17 is used and DU36 is connected by a plug wire to C17. A plug wire connects L5 to H17 and a plug wire connects M17 to C3 which leads to the actuating coil of relay 3, so that a punched hole in column 36, due to a purchase in that department would actuate the relay 17 and establish a circuit via the contact arms from M17 to H17 thereby allowing an actuating impulse to pass from DL4 via the bus jacks L1, L5, to H17, to M17 and on to C3 and through the winding of the coil 97 thereof. This would actuate the relay 3, breaking the circuit through the contact arms across B3 and H3 and disabling the control circuit from DL3 to FL4, and establishing a circuit via the contact arms across H3 and M3 whereby an impulse would pass from M3 via a plug wire to the jack E2—5. Upon the breaking of the control circuit the machine stops and prints as before described.

Switches 103, 106 and 109 are in the "off" position and 131 is in the "on" position, which means that it is connected to the side of the line of opposite polarity to that of the lower brushes.

The reset plugs 121 and 122 are connected together and to the lower brush jack DL2. Therefore the reset coils of the relays in group R1 to R18 in the master control unit receive an impulse when a hole appears in the second column of the card at the lower brushes.

The first bank "E1" is set on "List" and the other counters are on "Non List", the "Minor Control" switch is "on" and "Automatic Reset" is also "on".

Now with the machine and the master control unit connected up as above described, the cards are run through the machine once only, and the desired multiple result is obtained. One customer may be selected for more than one letter if the card meets the conditions of the problem, and the cards of customers who have previously requested that no mail be sent them will be rejected.

Many other connections may be made between the elements of the master control unit and the tabulating machine for the solution of many problems which cannot be done on the machine alone, but as these are innumerable only illustrations are herein given to describe the use of the master control unit in connection with a tabulating machine.

Although the examples of the use of the master control unit given herein were in connection with department store "customer control" the utility of this device is by no means confined to "customer control". A tabulating machine under control of the master control unit can perform with unsorted cards any functions that the same machine without the master control unit can perform with sorted cards. Furthermore, the tabulating machine can by means of the master control unit be made to perform functions that have been heretofore impossible, due to the fact that the relays in this unit have all operative points terminating in jacks or switches, making them "selectively connectable". These operative points are:

Each end of the magnet winding of the actuating coil in each relay,

Each end of the magnet winding of the reset coil in each relay,

And each one of the contact arms included in each relay.

Many changes may be made in the preferred form of master control unit described herein, both in the arrangement of and the types of relays or elements used, and the interconnections between the elements thereof and the elements of the tabulating machine without departing from the spirit of the invention.

A plug socket (not shown) may be provided in the tabulating machine, connected to both sides of the line, in which case the connector plug can be polarized or made so that it can be plugged therein only one way, with the polarities of wires 116, 117 in the unit in the right relation to the upper and lower brushes. Then the double pole double throw switch 114 would not be necessary.

What is claimed is:

1. In combination with a tabulating machine having a sensing means, an accumulator and machine control means, an electrical relay detachably included in a circuit with the sensing means and the machine control means, and a second relay detachably connected to said sensing means and to said first relay for disabling said circuit and for including said first relay in a circuit with the sensing means and the accumulator.

2. In combination with a record controlled tabulating machine having a sensing means, an accumulator machine control means and a source of power for said machine, a relay connected in a circuit with the sensing means and the machine control means one element of said relay being connected to said source, and means including a second relay connected to said sensing means and said first relay adapted under control of the records to disable said circuit and to include said first relay in a circuit with the sensing means and said accumulator.

3. In combination with a record controlled tabulating machine having a sensing means, accumulator and machine control means, a relay detachably connected to form a circuit with the sensing means and the machine control means one element of said relay under control of the sensing means adapted to disable said circuit and to simultaneously include said relay in a circuit with the sensing means and the accumulator, and another element of said relay also controlled by the sensing means for reestablishing said first circuit thereby disabling said last circuit.

4. In combination with a record controlled tabulating machine having a sensing means, and an accumulator, a relay having an actuating coil connected to said sensing means and contact arms connected to and adapted to establish a circuit between said sensing means and the accumulator, a second relay having contact arms included in and adapted to disable said circuit, and an actuating coil of said second relay connected to said sensing means whereby an impulse emanating from one of said records via the sensing means can pass to the accumulator only when said first relay has operated and said second relay has not operated.

5. In combination with a record controlled tabulating machine having a sensing means, and an accumulator, a relay having an actuating coil detachably connected to said sensing means and contact arms detachably connected to and adapted to establish a circuit between said sensing means and said accumulator, a second relay having contact arms detachably included in and adapted to disable said circuit, and an actuating coil of said second relay detachably connected to said sensing means whereby an impulse emanating from one of said records via the sensing means can pass to the accumulator only when said first relay has operated and said second relay has not operated, and reset coils for each of said relays detachably connected to said sensing means for resetting said relays after each operation thereof.

6. In combination with a record controlled tabulating machine having a sensing means, and an accumulator, a relay having an actuating coil detachably connected to the sensing means and contact arms detachably connected to and adapted to establish a circuit between said sensing means and the actuating coil of a second relay, and a third relay having contact arms detachably included in and adapted to disable said circuit, and having an actuating coil connected to said sensing means whereby an impulse emanating from one of the records via the sensing means will pass to said actuating coil of the second relay only when the first relay has operated and the third relay has not operated.

7. In combination with a record controlled tabulating machine having a sensing means and an accumulator, a relay having an actuating coil connected to the sensing means and contact arms connected to and adapted to establish a circuit between said sensing means and the actuating coil of a second relay, a third relay having contact arms included in and adapted to disable said circuit, and an actuating coil connected to said sensing means whereby an impulse emanating from one of said cards via the sensing means will pass to said actuating coil of the second relay only when the first relay has operated and the third relay has not operated, and reset coils for all said relays connected to said sensing means for electrically resetting said relays after each operation thereof.

8. In combination with a record controlled machine having a sensing means, an accumulator and machine control means, a relay having an actuating coil detachably connected to the sensing means and contact arms detachably connected to and adapted to establish a circuit between said sensing means and the actuating coil of a second relay, an armature for said second relay and a movable contact arm carried thereby, a stationary contact arm normally in contact with said movable arm and a second stationary contact arm adapted to be contacted by said movable arm when said relay is energized, detachable connections between said movable arm and said sensing means, detachable connections between said first stationary arm and said machine control means and detachable connections between said second stationary contact arm and said accumulator, and a third relay having contact arms detachably included in and adapted to disable said circuit, and an actuating coil connected to said sensing means whereby an impulse emanating from one of the records via the sensing means will pass to said actuating coil of the second relay only when the first relay has operated and the third relay has not operated, whereupon the circuit to said machine control means is broken and the circuit to said register means is closed.

9. In combination with a record controlled machine having sensing means, and an accumulator, a master control unit comprising a group of relays having actuating coils, reset coils and contact arms, terminals for each end of each coil and for each of said contact arms, one of said relays having one terminal of its actuating coil detachably connected to the sensing means and the other terminal detachably connected to a source of current and having its contact arms detachably connected to and adapted to establish a circuit between said sensing means and the accumulator, and a second of said relays having one terminal of its actuating coil detachably connected to the sensing means and the other terminal detachably connected to a source of current and having its contact arms detachably included in and adapted to disable said circuit whereby an impulse emanating from one of the records via the sensing means can pass to the accumulator only when a previous impulse has passed through the actuating coil of said first relay and when no impulse has passed through the actuating coil of said second relay.

10. In combination with a record controlled machine having sensing means, and an accumulator, a master control unit comprising a group of relays having actuating coils, reset coils and contact arms, terminals for each end of each coil and for each of said contact arms, one of said relays having one terminal of its actuating coil detachably connected to the sensing means and the other terminal detachably connected to a source of current and having its contact arms detachably connected to and adapted to establish a circuit between said sensing means and the accumulator, and a second of said relays having one terminal of its actuating coil detachably connected to the sensing means and the other terminal detachably connected to a source of current and having its contact arms detachably included in and adapted to disable said circuit whereby an impulse emanating from one of the records via the sensing means can pass to the accumulator only when a previous impulse has passed through the actuating coil of said first relay and no impulse has passed through the actuating coil of said second relay, and detachable connections between said sensing means, said reset coils and said source of current whereby impulses from said sensing means may reset said relays for the next operation thereof.

11. In combination with a record controlled tabulating machine having sensing means, an accumulator and machine control means, a control unit comprising a group of relays having actuating coils, reset coils and contact arms, terminals for each end of each coil and for each of said contact arms, one of said relays having one terminal of its actuating coil detachably connected to the sensing means and the other terminal detachably connected to a source of current and having its contact arms detachably connected to and adapted to establish a circuit between said sensing means and the actuating coil of a second of said relays, contact arms of said second relay comprising a first and a second stationary contact arm and a movable contact arm normally in contact with the first of the stationary arms and adapted to break contact with said first arm and make contact with said second arm when the actuating coil of the relay is energized, detachable connections between the sensing means and said movable arm, detachable connections between said first stationary arm and said machine control means, detachable connections between said second stationary arm and said accumulator, and a third relay having one terminal of its actuating coil detachably connected to the sensing means and the other terminal detachably connected to a source of current and having its contact arms detachably connected to and included in and adapted to disable said circuit whereby an impulse emanating from one of the records via the sensing means will pass to the actuating coil of said second relay only when a previous impulse has passed through the actuating coil of said first relay and an impulse has not passed through the actuating coil of the third relay, whereupon a circuit including said machine control means is broken and a circuit including said accumulator is established.

12. In combination, a tabulating machine having sensing means, and an accumulator; a control unit comprising a group of electrical relays having all circuit terminals brought out for connection to any of said means, and means detachably connecting some of said terminals to said sensing means, some of said terminals to said accumulator, and some of said terminals to each other, whereby said relays may receive electrical impulses from said first means and pass at least some of said impulses to said accumulator during a single record cycle.

13. In combination, a record controlled tabulating machine having sensing means, and an accumulator, a control device comprising a group of electrical relays having all coil and contact terminals brought out for connection to any of said means or to each other, means detachably connecting coil terminals of some of said relays to said sensing means, and means detachably connecting contact terminals associated with said last relays to each other, to the sensing means and to the accumulator, whereby said first connections may energize said coils in accordance with perforations appearing in certain predetermined columns in the records to complete a path between said sensing means and said accumulator through which impulses due to other perforations of known timing in the records may actuate the accumulator during a single record cycle.

14. In combination, a tabulating machine having sensing means, and an accumulator, records for said machine having perforations in two fields thereof in one of which the perforations are in known positions, a control device comprising a group of electrical relays having all actuating coil terminals, reset coil terminals and contact terminals brought out for connection to any of said means or to each other, means connecting actuating coil terminals of some of said relays to said sensing means, means connecting contact terminals associated with said last relays to each other, to the sensing means and to the accumulator, whereby said first connections may energize said coils in accordance with perforations appearing in certain predetermined columns in one of said fields in the records to complete a path between said sensing means and said accumulator through which impulses due to perforations in said field of known position may actuate the accumulator, and means connecting said reset coil terminals to said sensing means to receive an impulse due to a perforation in said field of known positions during a record cycle.

15. In combination with a record controlled machine having a sensing means, and an accumulator, a control unit comprised of a group of electrical relays each having an actuating coil, a reset coil, an armature and cooperating contacts associated therewith, said armature, terminals for said coils and contacts forming in part means for connecting said terminals to each other and to all said means, means connecting the actuating coils of said relays to said sensing means thereby placing the armatures associated with said coils under control of the record, and means connecting said armatures and contacts to each other, to the sensing means and to the accumulator, thereby forming a path between the sensing means and the accumulator through which an impulse may flow after said relays are actuated but during the same record cycle.

16. In combination with a tabulating machine having a sensing means including upper and lower brushes, an accumulator and machine control means, a control unit comprising a group of electrical relays having all coil and contact terminals so positioned relative to said machine that they may be connected to each other, to the upper or lower brushes, to the accumulator or to the machine control means, means detachably connecting at least one of said terminals to a source of power for said machine, detachable connections between coil terminals of some of said relays and said upper brushes, detachable connections between coil terminals of others of said relays and said lower brushes, detachable connections between some of said lower brushes, contact arms of said first connected relays and said accumulator, and detachable connections between some of said lower brushes, contact arms of said second connected relays and said machine control means, whereby said relays under control of the records may control the operation of said accumulator and said machine control means.

17. In combination with a tabulating machine having a sensing means including upper and lower brushes, and an accumulator, a control unit comprising a plurality of relays each having an actuating coil, an armature, a movable contact arm associated therewith and a stationary contact arm normally in contact with said movable arm, said contact adapted to be broken when said actuating winding is energized, a second stationary arm positioned adjacent to said movable arm and adapted to be contacted by the latter when said actuating coil is energized, detachable connections between one of said upper brushes and the actuating coil of one of said relays, detachable connections between another of said upper brushes and the actuating coil of a second of said relays, detachable connections between a third of said upper brushes and the actuating coil of a third relay, detachable connections between one of said lower brushes and said first stationary contact arm of the first relay, detachable connections between the movable contact arm of said first relay and the movable contact arm of the second relay, detachable connections between said second stationary contact arm of the second relay and the movable contact arm of the third relay, and detachable connections between said second stationary contact arm of the third relay and said accumulator, whereby the actuation of the coils in said second and third relays will complete a path through which an impulse may flow from said lower brush to said accumulator provided said first relay is not actuated by an impulse from said first upper brush.

18. In combination with a tabulating machine having a sensing means, a device adapted to be controlled by differentially timed impulses and machine control means, an electrical relay plugged into a circuit with the sensing means and the machine control means including means for disabling said circuit and for placing said relay in a circuit with the sensing means and said device and means for re-establishing said first circuit, thereby disabling said last circuit.

19. In combination with a record controlled machine having a sensing means, an accumulator means, machine control means, a plurality of records each having a series of perforations in known positions in one field and in unknown positions in another field, a plurality of circuit completing means detachably interconnected with said sensing means, said accumulator, said machine control means and with each other in such order that said circuit completing means in accordance with impulses which to a predetermined combination of perforations in said unknown field in the records actuate said circuit completing means to complete paths through which some of said known impulses may pass to the accumulator or to the machine control means.

20. In combination with a record controlled machine having a sensing means and a device adapted to be controlled by differentially timed impulses, a plurality of relays one of which has its contacts normally open and one of which has its contacts closed, means forming a circuit including said contacts between said device and one portion of said sensing means, connections between the windings of said first relay and another portion of said sensing means, and connections between said last relay and still another portion of said sensing means, whereby said circuit will be enabled only when said first relay is actuated and said second relay is not actuated.

21. In combination with a record controlled machine having a sensing means and a device adapted to be controlled by differentially timed impulses, a plurality of relays some of which have contacts normally open and one of which has its contacts normally closed, means forming a circuit including said contacts between said device and one portion of said sensing means, connections between the windings of said first relays and other portions of said sensing means, and connections between said last relay and still another portion of said sensing means, whereby said circuit will be enabled only when said first relays are actuated, and said last relay is not actuated.

22. In combination with a record controlled machine having a sensing means including upper and lower brushes and utilizing records having perforations in one field in known positions and in another field in unknown positions, a device adapted to be controlled by differentially timed impulses, machine control means, and connections to a source of current, a relay having an actuating coil, an armature, a contact normally engaged by said armature and a second contact adapted to be engaged by said armature when said coil is energized, a connection between the portion of the lower brush reading said first field and said armature, a connection between said first contact and said machine control means normally forming a circuit with said first connection, means connecting said device to said second contact and adapted to form a subsequent circuit with said first connection when said normal circuit is disabled, and means including said coil in a closed path with the portion of the upper brush reading said second field, and the side of said source of opposite polarity to that of the upper brush, whereby a known impulse may pass to said machine control means via said normal circuit when said coil is not energized, and the known impulse may pass to said device through said subsequent circuit when said coil is energized.

23. In combination with a record controlled machine connected to a source of current and having a sensing means and including a device adapted to be controlled by a differentially timed impulse, a plurality of relays one of which has its contacts normally open and another of which has its contacts normally closed, means forming a circuit including said contacts between said device and one portion of said sensing means, connections between one end of each of said windings and one side of said source, a connection between the other end of one of said windings and one portion of said sensing means, and another connection between the other end of the other of said windings and still another portion of said sensing means, whereby said circuit will be completed only when said first relay is actuated and said second relay is not actuated.

24. In combination with a record controlled machine having a sensing means connected to one side of a source of current, and a device adapted to be controlled by a differentially timed impulse having one terminal connected to the other side of said source; means setting up a circuit between another terminal of said device and said first side of the source via said sensing means and including a pair of contacts adapted to be closed and a second pair of contacts adapted to be opened, magnetic means associated with said first contacts and connected to said sensing means and the other side of said source for completing said circuit, and a second magnetic means associated with said second contacts and connected to said sensing means and the other side of said source for disabling said circuit.

25. In combination with a record controlled machine having sensing means and an accumulator, a control unit comprising a plurality of relays each having an actuating coil, an armature, a cooperating contact normally engaging said armature and a second contact adapted to be engaged by said armature when the same is actuated, one of said relays having one terminal of its actuating coil connected to the sensing means and its other terminal connected to a source of current for said machine, a second relay having one terminal of its actuating coil connected to said sensing means and its other terminal connected to said source; circuit means comprised of a connection between the sensing means and the armature of said first relay, a connection between one coil terminal of a third relay and the second contact of said first relay, a connection between the other coil terminal of the third relay and the armature of said second relay, and a connection between the cooperating contact of said second relay and said source; said circuit means being adapted to be completed to energize said third relay only when said first relay is actuated and said second relay is not actuated, and a circuit extending from the sensing means to said accumulator by the armature and one of the contacts of said third relay adapted to be completed when the latter is energized.

26. In combination with a tabulating machine including a sensing means, an accumulator and connections to a source of current, a master control unit comprising a first, a second and a third relay each having an actuating coil and a pair of closable contacts, a fourth relay having an actuating coil and a pair of contacts adapted to be opened when the coil is energized, a connection between one coil terminal of said first relay and the sensing means, a connection between one coil terminal of said third relay and the sensing means, a connection between one coil terminal of the fourth relay and the sensing means, connections between the other coil terminals of the first, third and fourth relays and said source, means setting up a circuit from said sensing means through the contact arms of said first relay, the actuating coil of said second relay, the contact arms of said third and said fourth relays to said source adapted to be completed when said first and said third relays are actuated and said fourth relay is not actuated, and means forming a circuit between the sensing means, contacts of said second relay and said accumulator adapted to be completed when the coil of said second relay is energized.

27. In combination with a tabulating machine having a sensing means including upper brushes and lower brushes, utilizing records having perforations in known positions in one field and in unknown positions in another field, an accumulator, and connections to a source of direct current, a relay having an actuating coil, a reset coil, an armature and a cooperating contact point adapted to be engaged by the armature when said actuating coil is energized, a connection between one of said upper brushes reading said unknown field and one terminal of said actuating coil, a connection between the other terminal of said coil and the side of said source opposite to that of said upper brushes, a conductor connected between one of said lower brushes reading said known field and said armature, a conductor connected between said contact and said accumulator, said conductors forming a circuit adapted to be completed when said coil is energized by an impulse from an upper brush, thereby permitting an impulse from said lower brush to be delivered to said accumulator during the same cycle in which the relay is energized, and connections from said source via said reset coil to a lower brush reading said known field, whereby said relay may be reset at a definite time in the record cycle.

28. In combination with a tabulating machine having a sensing means including upper brushes and lower brushes utilizing records having perforations in known positions in one field and in unknown positions in another field, an accumulator, and connections to a source of direct current, a plurality of relays one having an actuating coil, a reset coil, an armature and a cooperating contact point adapted to be engaged by the armature when said actuating coil is energized, and another having an actuating coil, a reset coil, an armature and a cooperating contact adapted to be disengaged when its actuating coil is actuated, a connection between one of said upper brushes and one terminal of the actuating coil of said first relay, a connection between another of said upper brushes and one terminal of the actuating coil of said second relay, connections between the other terminals of said coils and the side of said source of opposite polarity to that of said upper brushes, means setting up a circuit between one of said lower brushes and said accumulator including the armature and cooperating contact of said first relay and the armature and cooperating contact of said second relay, said circuit being adapted to be completed when the actuating coil of said first relay receives an impulse and the actuating coil of said second relay does not receive an impulse, and connections from said source via said reset coils to a lower brush reading said known field, thereby resetting said relays at a definite time in the record cycle.

29. In combination with a record controlled machine utilizing records having perforations in one field in known positions and in another field in unknown positions and having a sensing means including brushes and a conductor, a device adapted to be controlled by differentially timed impulses, and connections to a source of current, a relay having an actuating coil, an armature and a contact adapted to be engaged by said armature when said coil is energized, a second relay having an actuating coil, a reset coil, an armature and a contact adapted to be engaged by said armature when the actuating coil is energized and disengaged therefrom when the reset coil is energized, a connection from a brush reading said second field of the record to one terminal of the coil of the first relay, a connection from the other terminal of said last coil to the armature of said second relay, a connection between the contact of the second relay and one side of said source, said last connections to the armature and the contact forming a return circuit for the coil of the first relay adapted to be completed by said second relay; circuit means including a brush reading said first field, the armature and the contact of said first relay, and said device, adapted to be completed when the coil associated therewith is energized; a wire connecting one terminal of the actuating coil and one terminal of the reset coil of said second relay to one side of said source, a wire connecting the actuating coil of the second relay to a brush reading said first field, another wire connecting the reset coil of the second relay to another brush reading said first field and adapted to institute a known impulse of lower numerical value than that connected to said actuating coil, whereby said return circuit will be completed only during a definite or predetermined portion of a record cycle.

30. In combination with a tabulating machine having a sensing means and an accumulator, and operating under control of records having perforations in one field in known positions and in another field in unknown positions, circuit controlling means under control of impulses instituted at the sensing means by unknown perforations appearing in selected record columns for completing a circuit between said sensing means and said accumulator, through which circuit an impulse instituted by a known perforation may be delivered to said accumulator.

31. In combination with a tabulating machine having a sensing means and an accumulator, and operating under control of records having perforations in one field in unknown positions and in another field in known positions, circuit controlling means under control of impulses instituted at the sensing means by perforations appearing in selected columns of said first field for completing a circuit connecting said sensing means and said accumulator, whereby an impulse instituted by a perforation in said second field may be delivered to the accumulator.

32. In combination with a tabulating machine having a sensing means and an accumulator, and operating under control of records having perforations in one field in unknown positions and in another field in known positions, means setting up a circuit between said sensing means and said accumulator, circuit control means under control of impulses instituted at the sensing means by perforations appearing in selected columns of said first field, associated with said circuit for completing the same, and another circuit control means under control of impulses instituted by perforations in another selected column in said first field, associated with said circuit for disabling the same, whereby a known impulse may pass from said sensing means to said accumulator when said first control means has acted and said second control means has not acted.

33. In combination with a tabulating machine having a sensing means and an accumulator, and operating under control of records having perforations in one field in known positions and in another field in unknown positions, circuit controlling means under control of impulses instituted at the sensing means by unknown perforations appearing in selected record columns for completing a circuit between said sensing means and said accumulator, through which circuit an impulse instituted by a known perforation may be delivered to said accumulator, and a second circuit controlling means associated with said first circuit controlling means and acting under control of impulses instituted at the sensing means by others of said known perforations for rendering said first circuit controlling means effective during a definite portion of a record cycle only.

34. In combination with a tabulating machine having a sensing means and an accumulator, and operating under control of records having perforations in one field in unknown positions and in another field in known positions, circuit controlling means under control of impulses instituted at the sensing means by perforations appearing in selected columns of said first field for completing a circuit connecting said sensing means and said accumulator, whereby an impulse instituted by a perforation in said second field may be delivered to the accumulator, and a second circuit controlling means associated with said first circuit controlling means and acting under control of impulses instituted at the sensing means by others of said known perforations for rendering said first circuit controlling means effective during a definite portion of a record cycle only.

35. In combination with a tabulating machine having a sensing means and an accumulator, and operating under control of records having perforations in one field in unknown positions and in another field in known positions, means setting up a circuit between said sensing means and said accumulator, circuit control means under control of impulses instituted at the sensing means by perforations appearing in selected columns of said first field, associated with said circuit for completing the same, another circuit control means under control of impulses instituted by perforations in another selected column in said first field, associated with said circuit for disabling the same, whereby a known impulse may pass from said sensing means to said accumulator when said first control means has acted and said second control means has not acted, and a third circuit control means associated with said first and second circuit control means and controlled by impulses instituted by perforations in said second field for rendering said first and second circuit control means effective during a definite portion of a record cycle only.

36. In combination with a tabulating machine having a sensing means, an accumulator, and machine control means, said machine being controlled by records having perforations in one field in unknown positions and in another field in known positions, means setting up a circuit between said sensing means and said machine control means through which impulses instituted at the sensing means by perforations in said second field may be delivered to the machine control means during each record cycle to keep the machine running and feeding records, and circuit control means under control of impulses initiated at the sensing means by perforations in selected columns in said first field of the record for disassociating said machine control means from said circuit and for including said accumulator in said circuit, whereby said known impulse will be delivered to said accumulator and said machine control means, upon being deprived of said known impulse, institutes a total taking operation.

37. In combination with a tabulating machine having a sensing means, an accumulator, and machine control means, said machine being controlled by records having perforations in one field in unknown positions and in another field in known positions, means setting up a circuit between said sensing means and said machine control means through which impulses instituted at the sensing means by perforations in said second field may be delivered to the machine control means during each record cycle to keep the machine running and feeding records, circuit control means under control of impulses initiated at the sensing means by perforations in selected columns in said first field of the record for disassociating said machine control means from said circuit and for including said accumulator in said circuit, whereby said known impulse will be delivered to said accumulator and said machine control means, upon being deprived of said known impulse, institutes a total taking operation, and a second circuit control means under control of perforations in another selected column in said first field for rendering said first circuit control means ineffective.

38. In combination with a tabulating machine having a sensing means, an accumulator, and machine control means, said machine being controlled by records having perforations in one field in unknown positions and in another field in known positions, means setting up a circuit between said sensing means and said machine control means through which impulses instituted at the sensing means by perforations in said second field may be delivered to the machine control means during each record cycle to keep the machine running and feeding records, circuit control means under control of impulses initiated at the sensing means by perforations in selected columns in said first field of the record for disassociating said machine control means from said circuit and for including said accumulator in said circuit, whereby said known impulse will be delivered to said accumulator and said machine control means, upon being deprived of said known impulse, institutes a total taking operation, and a second circuit control means under control of perforations in said second field for rendering said first circuit control means effective only during a definite portion of a record cycle.

39. A record controlled tabulator having an accumulator, a sensing means for reading the records, machine control means for controlling the operating cycles of said tabulator, master control means including circuit controlling means under control of electrical instrumentalities, means connecting said instrumentalities to one portion of said sensing means, and means connecting said circuit controlling means in circuit with another portion of said sensing means, said accumulator and machine control means thereby placing the accumulator and machine control means under control of said last portion of the sensing means, said control being subject to the actuation of said instrumentalities by said first portion of the sensing means.

40. A record controlled tabulating machine comprising in combination, electric means for reading data from record cards including upper and lower brushes, machine control means, an accumulator, a plurality of relays having contact arms and actuating coils; connections from one of said lower brushes to a contact arm of one of said relays, connections from a contact arm cooperating with said first contact arm to a contact arm of a second relay, connections between a contact arm cooperating with the contact arm of said second relay and the actuating coil of a third relay, connections between a lower brush and a center or hinge contact arm of said third relay, a make contact arm and a break contact arm cooperating with said hinge contact arm, connections between said break contact arm and said machine control means, connections between said make contact arm and said accumulator, connections between the actuating coils of said first and second relays and at least some of said upper brushes thereby placing said relays under control of a record at the upper brushes for determining whether the data therein shall be accumulated and a total taking cycle initiated.

41. In combination with a tabulating machine having a sensing means including upper and lower brushes and an accumulator, a record having perforations in two fields, one in which perforations appear in known positions in every record and the other in which the perforations appear in indiscriminate order, a control device including a plurality of relays, one of said relays including an actuating coil, and an armature having contact arms associated therewith, another of said relays having a fast-acting coil, a slow-acting coil, an armature and contact arms associated therewith, means connecting the actuating winding of said first relay to one of said upper brushes sensing said second field in the records, means connecting a contact arm of said connected relay to a lower brush sensing said first field in the records, and means connecting a contact arm cooperating with said connected contact arm in circuit with said accumulator, means including the armature and one of the contact arms of said second relay in the return circuit of the actuating coil of said first relay, circuit means connecting the fast acting coil of the second relay with the sensing means to receive a known impulse of predetermined value and cause the completion of said return circuit, means connecting the slow-acting coil with the sensing means to receive a known impulse of less numerical value than said first known impulse to cause said return circuit to be disabled, whereby an impulse due to a perforation in the record in said second field at the upper brushes may control the functioning of the accumulator where perforations appear only in predetermined positions in record columns in the second field.

42. In a machine controlled by records containing perforations arranged in columns representing data, electrical means for reading the records, a control magnet in said machine, circuit controlling devices some of which are adapted to disable a circuit when actuated, and others of which are adapted to enable a circuit when actuated, magnets for actuating each of said devices, circuit means connecting some of said devices of each type between the means reading some of said columns and said control magnet, and circuit means connecting the actuating magnets for said connected devices to said means reading other columns in the records for automatically determining in accordance with data in said last-mentioned columns whether data from said first-mentioned columns shall cause said control magnet to operate or not.

43. In a record controlled machine in combination, a sensing means, a recording means, a plurality of unsorted records each having perforations in known positions in one field and in unknown positions in a second field, means forming a circuit between one portion of said recording means and a portion of said sensing means reading said first field, electrically controlled switching means included in said circuit, connections forming a control circuit between the controls of said switching means and a portion of said sensing means reading predetermined columns of the record in said second field, whereby said control circuit may be completed by impulses instituted by perforations appearing in said predetermined columns, thereby completing said first circuit and permitting impulses instituted by perforations in said first field to be delivered to said recording means to effect the printing of symbols in accordance with the index values of said last impulses, and circuit means connecting another portion of said recording means to a portion of the sensing means reading certain other columns in said second field to effect the printing of designations identifying the records from which the known and unknown impulses utilized were instituted.

44. In a record controlled machine in combination, a sensing means, a recording means, a plurality of unsorted records adapted to institute some impulses in haphazard order and other impulses in known order at the sensing means, connections forming a circuit between said recording means and a portion of the sensing means at which said second impulses are initiated, a plurality of control means included in said circuit, magnets associated with some of said control means for causing the latter to enable said circuit, another magnet associated with another of said control means and adapted to cause said last control means to disable said circuit, and connections between each of said magnets and a portion of said sensing means at which said first impulses are instituted whereby said circuit may be completed for delivering a known impulse to said recording means when said first magnets are energized by said first impulses and said last magnet is not energized, thereby controlling said recording means conjointly by said haphazard impulses and a known impulse.

45. In a record controlled machine in combination, a plurality of unsorted records having perforations in known positions and in unknown positions, a sensing means including sensing brushes, entry-receiving means, electrically controlled means connected to and adapted to complete a circuit between a brush of the sensing means reading a record column in which known perforations occur and said entry-receiving means, connections between the control for said electrically controlled means and another brush of the sensing means reading another record column in which unknown perforations occur, whereby an impulse instituted by an unknown perforation in said last column will, through the medium of said control, effect the completion of said circuit, thereby permitting a value in accordance with the index position of a known perforation in said first column to be entered into said entry-receiving means instead of the index value of the unknown perforation in said second column, thus substituting the index value of one perforation for the value of another.

46. In a tabulating machine, the combination of a recording means, a machine-control means, a plurality of unsorted records each having perforations in known positions in one field and in unknown positions in a second field, a sensing means for reading the columns in said records and translating the indicia represented by said perforations into electrical impulses, a plurality of electrically controlled means connected to and adapted to complete a circuit between a portion of said sensing means reading a column in said first field and said recording means, connections between the controls of said electrically controlled means and another portion of said sensing means reading predetermined record columns in said second field, whereby impulses instituted by perforations in said last columns through the medium of said controls may complete said circuit and permit a predetermined known impulse derived from said first field to be delivered to said recording means.

47. The invention according to claim 46 in which said circuit includes an electrically controlled circuit opening means having its control connected to said sensing means to receive an unknown impulse instituted by a perforation falling in another predetermined position in the second field of the record serving to disable said circuit when a perforation appears in said last-mentioned position.

48. In a record controlled machine, in combination, a sensing means including upper and lower brushes each adapted to read a column of the records, a plurality of unsorted records having perforations in known positions in one field and in unknown positions in a second field, a machine control means including a magnet, connections between one terminal of said magnet and an upper brush reading said first field, connections between the other terminal of said magnet and a corresponding lower brush reading said first field, circuit opening means included in said last connections, magnetic means for operating said circuit opening means, electrically controlled circuit closing means connected between said magnetic means and another lower brush reading said first field, connections between the controls for said circuit closing means and upper brushes reading predetermined columns in said second field of the records, whereby the absence of a perforation in any one of said predetermined columns fails to operate said circuit closing means and allows a known impulse to pass through said magnet, and the appearance of perforations in all of said predetermined columns effects the actuation of said circuit closing means and in turn causes said magnetic means to actuate said circuit opening means, thereby preventing said magnet from receiving an impulse.

49. In a record controlled machine in combination, a sensing means including upper and lower brushes, an accumulator and machine control means, connections between one of said upper brushes and said machine control means, a connection between a corresponding lower brush and electrically controlled circuit controlling means, a connection between said circuit controlling means and said machine control means, a second connection between said circuit controlling means and said accumulator, said circuit controlling means and said connections normally maintaining a circuit between said lower brush and said machine control means, and adapted when actuated to disable said last circuit and to complete a circuit between said lower brush and said accumulator, and means connecting the electrical control for actuating said circuit controlling means to one of the brushes of the sensing means reading a predetermined column in the record, whereby the absence of perforations in said predetermined column will cause the machine control means to receive an impulse instituted at said corresponding lower brush and whereby the appearance of a perforation in said predetermined column will cause said circuit controlling means to effect the delivery of an impulse from said corresponding lower brush to said accumulator instead of said machine control means and the latter being deprived of said impulse institutes a total taking operation.

50. In a machine normally adapted to be controlled by sorted records having data therein in indiscriminate order, said machine having a sensing means, machine-control means and accumulator means; means for controlling said machine by unsorted records having perforations therein in one field in known positions and in a second field in unknown positions, comprising, in combination: electrically controlled means interposed between a portion of the sensing means reading said known field and the machine-control means and said accumulator means, said electrically controlled means forming a normally closed circuit between said portion of the sensing means and said machine-control means and a normally open circuit between said portion of the sensing means and said accumulator means, said normally open circuit being closed when said normally closed circuit is opened, and connections between the control for said electrically controlled means and another portion of the sensing means reading a predetermined column in said unknown field whereby impulses instituted by perforations in said predetermined column in said second field may through the medium of said controls effect the opening of said first circuit and the closing of said second circuit to cause impulses instituted at the sensing means in said first field to be delivered to said accumulator means instead of said machine-control means.

51. In a record controlled machine in combination, a plurality of records having perforations in one field in known positions and in a second field in unknown positions, a sensing means including brushes, each adapted to sense a column of the records, a control magnet, electrically controlled circuit closing means connected to and adapted to complete a circuit between one of said brushes reading a column in said first field and said control magnet, connections forming a normally open circuit between the electrical control for said circuit closing means and a brush reading a column of the record in said second field through which an unknown impulse may flow when said open circuit is closed, a switching device included in said circuit and adapted when in one position to open said circuit and when in another position to close the same, an electro-magnet interconnected with a second brush reading another column in said first field and adapted when energized by an impulse derived from said second brush to actuate said switching means to complete said circuit, a second electro-magnet interconnected with a third brush reading still another column in said first field and adapted when energized by an impulse derived from said third brush to actuate said switching means to open said circuit, the value of said unknown impulse derived from the brush reading the column of said second field being intermediate the values of impulses derived from said second and third brushes reading said first field, thereby rendering said circuit closing means responsive only to an impulse instituted by a perforation of a given index value or values in said column of said second field regardless of the fact that perforations of other values may also appear in the same column.

LINCOLN M. KEEFE.